United States Patent [19]

Cunningham et al.

[11] 4,253,149
[45] Feb. 24, 1981

[54] APPARATUS FOR PROVIDING A COURSE CORRECTION SIGNAL TO AN ELECTRONIC AUTOMATIC PILOT TO MAINTAIN A VESSEL ON A PREDETERMINED GEOGRAPHIC COURSE

[75] Inventors: Peter M. Cunningham; Robert M. Freeman, both of Tacoma, Wash.

[73] Assignee: Metal Marine Pilot, Inc., Tacoma, Wash.

[21] Appl. No.: 12,040

[22] Filed: Feb. 14, 1979

[51] Int. Cl.³ ........................ G05B 11/42; B63H 25/04
[52] U.S. Cl. .................................. 364/444; 364/452; 364/457; 318/588
[58] Field of Search ............... 364/443, 444, 452, 447, 364/457; 343/112 R, 112 C; 340/27 NA, 29, 30; 73/178 R; 35/10.21, 10.22; 318/586, 588, 609, 610

[56] References Cited

U.S. PATENT DOCUMENTS

| | | | |
|---|---|---|---|
| 3,375,520 | 3/1968 | Groot et al. | 364/452 |
| 3,603,775 | 9/1971 | Galloway et al. | 364/457 |
| 3,683,378 | 8/1972 | Polhemus | 364/457 |
| 3,741,474 | 6/1973 | Kawada et al. | 364/457 |
| 3,906,641 | 9/1975 | Freeman | 33/363 R |
| 3,946,691 | 3/1976 | Freeman | 318/588 |
| 4,038,528 | 7/1977 | Fowler | 364/457 |
| 4,040,374 | 8/1977 | Greene | 318/588 |
| 4,071,898 | 1/1978 | Schorsch et al. | 364/452 |
| 4,074,648 | 2/1978 | Reid et al. | 318/588 |
| 4,129,087 | 12/1978 | Dimmick et al. | 364/457 |

OTHER PUBLICATIONS

"Radar Aids to Navigation" by Hall, published by McGraw Hill in 1974, pp. 56–85.
American Practical Navigator by Bowditch, published in 1977, No. 9, vol. 1, pp. 991–1002.

Primary Examiner—Charles E. Atkinson
Assistant Examiner—Gary Chin
Attorney, Agent, or Firm—Christensen, O'Connor, Johnson & Kindness

[57] ABSTRACT

A system for controlling the course of a vessel. A digital computer 22 receives information signals from a geographic position locator 20, such as a Loran-C receiver, a depth sounder, or a water temperature sensor, and is also capable of interactive communcations with a remote terminal 24 which is accessible by an operator of the vessel. The digital computer 22 continuously monitors the information signals and develops therefrom a digital output signal representing the sign and magnitude of vessel cross-track error. To obtain information required to determine cross-track error, and to obtain certain other information relating to the identity and type of the geographic position locator 20, the digital computer 22 transmits questions to the remote terminal 24 for display therby and evaluates responses made by the operator through remote terminal 24. The digital computer 22 may be enabled or disabled in response to instructions from the operator using remote terminal 24. The digital computer 22 may also be disabled during the existence of an alarm condition resulting from instability in the information signals, or upon detection of information in the information signals representing loss of tracking by the geographic position locator 20. An interface unit 30, which is enabled only when the digital computer 22 is enabled, converts the cross-track error information in the digital output signal into a corresponding analog cross-track error signal. After suitable amplitude scaling, the analog cross-track error signal is integrated, and the integrated signal is summed with the analog cross-track error signal, to develop a course correction signal which is adapted to be summed with a heading error signal in a conventional electronic automatic pilot, whereby the electronic automatic pilot is capable of maintaining the vessel at a desired heading and on a predetermined geographic track.

22 Claims, 29 Drawing Figures

APPARATUS FOR PROVIDING A COURSE CORRECTION SIGNAL TO AN ELECTRONIC AUTOMATIC PILOT TO MAINTAIN A VESSEL ON A PREDETERMINED GEOGRAPHIC COURSE

FIELD OF THE INVENTION

This invention generally relates to electronic automatic pilots for marine vessels and, more particularly, to an apparatus which is responsive to vessel position and-/or vessel track error information obtained from a geographic position locator, such as a Loran-C receiver, a depth sounder or a water temperature sensor, for providing a course correction signal to an electronic automatic pilot, whereby the electronic automatic pilot is capable of maintaining the vessel on a predetermined geographic track.

BACKGROUND OF THE INVENTION

Electronic automatic pilots are well known to the art for controlling the actual heading of a vessel so as to maintain the vessel on a desired course or heading. In simplest form, such electronic automatic pilots include a heading error sensor which provides a heading error signal related to the angular deviation between the actual heading of the vessel and a desired heading that has been set into the heading error sensor by a navigator or operator of the vessel. A control surface angle sensor is also provided to furnish an output signal which is related to the angular deviation of a control surface of the vessel, such as the vessel's rudder, from the longitudinal axis of the vessel. The heading error signal and the output signal from the control surface angle sensor are differentially combined to develop an error signal which is used to control the position of the control surface so as to return the actual heading of the vessel to the desired heading.

A heading error sensor particularly suited for marine applications, and a marine electronic automatic pilot including such a heading error sensor, are disclosed and claimed in U.S. Pat. Nos. 3,906,641, and 3,946,691, respectively, which are both assigned to the assignee of the present invention. As described in these patents, the heading error sensor comprises a magnetic compass including a Hall-effect device whose output is proportional to the sine of the angular deviation between the actual magnetic heading and a desired magnetic heading of the vessel, and also comprises an electronic circuit responsive to the output signal from the Hall-effect device for providing a heading error signal which is related to the angular deviation, and the rate of angular deviation, of the vessel. The heading error signal and the output signal from the control surface angle sensor, which may also comprise a Hall-effect device, are supplied to respective inputs of a differential amplifier to develop the aforementioned error signal which is then coupled through a control surface driver to appropriately position the control surface or rudder of the vessel.

The conventional method of navigation, using such electronic automatic pilots, is by dead reckoning, in which the navigator determines the geographic coordinates (by latitude and longitude) of the present and desired geographic positions of the vessel, and computes therefrom a desired magnetic heading to the desired geographic position and sets that desired magnetic heading into the magnetic compass. In addition, the navigator computes the distance between the present and desired geographic positions, and computes therefrom the estimated time of arrival, given a predetermined vessel speed and also considering the effects of wind and current on the vessel.

The ability of an electronic automatic pilot to control the course of a vessel so as to arrive at a predetermined geographic position is limited, however, by a number of factors commonly encountered. As an example, the magnetic compass may not have been properly compensated for errors in the sensed magnetic heading of the vessel, such as heeling errors, northerly turning errors, and errors resulting from adjacent steel or other magnetic elements. Alos, the navigator may have made an error in computation of the desired magnetic heading, such as by failing to properly account for magnetic variation, or changes in magnetic variation, along the desired course. Likewise, the navigator may make an error in setting the magnetic compass to the desired magnetic heading, or may not be capable of precisely setting the desired magnetic heading (in degrees, minutes and seconds) due to the resolution capability of the magnetic compass. Most important, winds and waves which bear on the vessel, in directions generally transverse to the vessel's course, as well as transverse currents, cause the vessel to laterally drift from its desired course. Since the electronic automatic pilot is responsive only to heading error, it is incapable of correcting the vessel's course when the vessel experiences lateral drift but does not experience heading error.

When vessels are navigated by visual references such as are found on coastal and inland waters, frequent updates of vessel position using these visual references is possible, either by direct sighting or by radar. In cases where visual references are not available, as when the vessel is operating offshore, the navigator can determine vessel position by conventional celestial navigation, or by the use of electronic navigation systems. In all such cases, however, the navigator must manually make whatever course corrections are needed to insure that the vessel will arrive at the desired geographic position.

For general navigation purposes, it is not required that a vessel arrive at or return to a precise geographic position. There are many situations, however, in which such precision is required, for example, upon entering a harbor, and to locate fish traps, crab and lobster pots, fishing nets and set lines, oil well heads, fishing holes, mineral fields and so forth. To obtain such precision, navigators can use information obtained from an automated type of geographic position locator.

Such a geographic position locator may comprise part of an electric navigation system such as the well-known Loran-C system. The Loran-C system includes a plurality of Loran-C chains, each chain comprising a master transmitter and at least a pair of slave transmitters, all located at separate geographic positions. At predetermined group repetition intervals, the master transmitter in each chain transmits a pulse group having a predetermined format. Upon reception of the master pulse group, each slave transmitter in the chain transmits its own slave pulse group, again having a predetermined format, at a time which is very precisely controlled with respect to initiation of pulse transmission by the master transmitter. A Loran-C receiver on the vessel is used to detect and compare the master pulse group and a slave pulse group from one of the slave transmitters, in order to determine the time difference of arrival of such pulse groups at the Loran-C receiver. Due to the arrangement of the Loran-C system, the locus of all geographic positions where the observed time difference of arrival is constant comprises a fixed and invariable hyperbolic line of position. Therefore, the geographic position of the vessel along one such line of position may be ascertained by determining such a time difference. By determining the time difference of arrival of the master pulse group and a slave pulse group from another slave transmitter in the chain, a second line of position may be ascertained, with the actual geographic position of the vessel being represented by the intersection of the two lines of position. For further information relating to the construction and operation of the Loran-C system, reference should be made to Bowditch, *American Practical Navigator*, Pub. No. 9, Vol. 1, pp. 991-1002 (1977).

The Loran-C receivers that are presently available include a digital computer which is programmed, using information entered into the computer by the navigator, to compute the actual geographic position of the vessel. Further, these receivers have the capability of computing a desired track of the vessel between the actual geographic position of the vessel and a desired geographic position thereof, and for displaying to the navigator, in real time, the lateral distance that the vessel has drifted from the track, or, cross-track error, and the direction of such drift, that is, whether to the left or to the right of the track. Since geographic positions can be very accurately and precisely determined by the digital computer, the computer is also programmed to compute, and display, the time of arrival of the vessel at the desired geographic position. Using this information, the navigator is able to correct the actual course of the vessel and to thus arrive at the desired geographic position. Under normal conditions, a properly calibrated Loran-C receiver of this type is capable of computing geographic position to an accuracy of 1500 feet throughout a maximum range of 1200 nautical miles at day and 2500 nautical miles at night.

Although such Loran-C receivers are capable of very high accuracy and precision in determining geographic position, their use is subject to the disadvantage that the navigator must manually control the course of the vessel in accordance with the information provided by the Loran-C receiver. It has been proposed that the information obtained from a Loran type of receiver be used to develop a signal that would automatically correct the course of the vessel to maintain the vessel on the desired geographic track. However, such a proposal has not been subject to implementation in any practical form. Although the reliability of each Loran-C chain is very high (typically 95%), the ability of presently available Loran-C receivers to maintain a continuous determination of geographic position, and consequent determination of cross-track error, is limited by a number of factors, including inadequate signal-to-noise ratio in any received pulse groups, loss of one or more of the received pulse groups or distortion in the pulse groups as received, which results in the receiver not being able to effect accurate pulse group comparison. As another, more important example, the Loran-C receiver is incapable of determining the instantaneous heading of the vessel. As a result, any attempt to control the course of the vessel, using only the information from a Loran-C receiver, will result in continual short-term changes in the actual heading of the vessel. At best, the vessel's actual motion through the water would constantly zigzag or oscillate about the desired track, and in the worst case, the vessel may be turned around 180° from its desired heading.

There are certain other types of geographic position locators which would be useful in controlling the course of the vessel. To take fishing vessels as a particular example, it is oftentimes desirable for the vessel to track over water of constant depth, or, an isodepth, or to remain in water of equal temperature, or, an isotherm. In such cases, water depth and water temperature may be monitored by the use of a depth sounder and temperature sensor, respectively. The operator of the vessel may therefore correct the vessel's course in accordance with the information obtained from the depth sounder or temperature sensor. Although it is desirable to use this information to directly control the course of the vessel to follow the desired isodepth or isotherm, no practical means has been suggested for achieving this object, inasmuch as depth sounders and temperature sensors, like Loran-C receivers, are not capable of providing information as to the instantaneous heading of the vessel.

It is therefore an object of this invention to provide an apparatus which is capable of accurately and precisely controlling the course of a vessel in accordance with information obtained from a geographic position locator.

It is another object of this invention to provide an apparatus which is adapted to couple a geographic position locator to an electronic automatic pilot, and which functions to provide a course correction signal to the electronic automatic pilot, in response to the vessel position and/or vessel track error information from the geographical position locator, with the course correction signal being such so as to allow the electronic automatic pilot to maintain the vessel on a predetermined geographic track.

It is yet another object of this invention to provide such an apparatus which is capable of receiving and responding to information, in the form of analog or digital signals of various types, which are provided by a plurality of different types of geographic position locators, including Loran-C receivers, depth sounders, and temperature sensors.

It is a further object of this invention to provide such an apparatus which is capable either of using cross-track error information from a geographic position locator to develop a course correction signal for an electronic automatic pilot, or of computing a predetermined geographic track from information supplied to the apparatus by an operator of the vessel, and of correspondingly responding to geographic position information provided by a geographic position locator to develop a course correction signal in accordance with the thus-computed, predetermined geographic track.

It is yet a further object of this invention to provide such an apparatus which includes a digital computer which is programmed to develop a digital cross-track error signal, using information supplied to the digital computer by one of a plurality of geographic position locators and by the operator.

It is still a further object of this invention to provide such an apparatus which includes a remote terminal, accessible by the operator, which is capable of interactive communications with the digital computer for the entering and displaying of information pertinent to the operation of the apparatus.

It is an object of this invention to provide such an apparatus which includes a digital computer and a remote terminal which can be easily and inexpensively implemented by the use of readily available microprocessor integrated circuit chips.

It is an additional object of this invention to provide, in such apparatus, an interface unit which is responsive to the digital cross-track error signal from the digital computer, and to other information from the digital computer, for selectively producing a course correction signal which is capable of combination with a heading error signal provided by a heading error sensor within an electronic automatic pilot.

It is another additional object of this invention to provide such an apparatus which is capable of terminating the production of a course correction signal, and of providing an alarm indication to the operator, upon detection of an alarm condition signified by alarm information transmitted from a geographic position locator such as a Loran-C receiver, or signified by instability in cross-track error information or geographic position information from the geographic position locator.

SUMMARY OF THE INVENTION

Briefly, the foregoing objects are generally achieved in an apparatus for providing a course correction signal which is suitable for combination with a heading error signal in an electronic automatic pilot, whereby the electronic automatic pilot is capable of maintaining the course of a vessel on a predetermined geographic track. The apparatus comprises: first means responsive to information signals from a geographic position locator for producing a first output signal that is proportional to cross-track error of the vessel, comprising the direction and magnitude of any lateral separation between the actual geographic position of the vessel and the predetermined geographic track; second means responsive to the first output signal for producing a second output signal that is proportional to the time integral of cross-track error; and, third means for combining the first and second output signals to produce the course correction signal.

In a preferred embodiment, the first means comprises a digital computer and at least one remote terminal interconnected with the digital computer. The digital computer is adapted to receive information signals from each of a plurality of geographic position locators, and includes: means for transmitting digital computer data to and for receiving remote terminal data from the remote terminal; means responsive to function command data in the remote terminal data for selecting and decoding those information signals from one of the plurality of geographic position locators; means for detecting cross-track error information in the selected and decoded information signals; and, means for providing a digital output signal containing cross-track error information. The remote terminal includes: means for transmitting remote terminal data to and for receiving digital computer data from the digital computer; manually actuable data entry means which is capable of providing remote terminal data including function command data; and, visual display means for displaying the remote terminal data and the digital computer data.

In the preferred embodiment, the manually actuable data entry means in the remote terminal may be capable of providing mode command data in the remote terminal data, and, the digital computer may further include means responsive to the mode command data for enabling or disabling the digital output signal. The digital computer may also include means responsive to status information in the selected and decoded information signals for detecting an alarm condition; and, means responsive to detection of an alarm condition for disabling the digital output signal. The digital computer may also include means responsive to instability in the cross-track error information over a predetermined period of time for detecting an alarm condition. Means may also be provided in the digital computer for producing alarm data in the digital computer data upon detection of an alarm condition, and the remote terminal may include means responsive to the alarm data for providing an audible alarm to the operator of the vessel. Finally, the digital computer may be operative to compute cross-track error information. In such a case, the digital computer may include means for detecting geographic position information in the selected and decoded information signals, and means responsive to detection of the geographic position information for providing question data in the digital computer data for display by the visual display means of the remote terminal. The manually actuable data entry means of the remote terminal may be capable of providing vessel desired course data in the remote terminal data, and the digital computer may further include means responsive to the vessel desired course data for determining the predetermined geographic track, and means for determining cross-track error information from the geographic position information and from the predetermined geographic track.

BRIEF DESCRIPTION OF THE DRAWINGS

The invention can best be understood by reference to the following portion of the specification, taken in conjunction with the accompanying drawings, in which.

DESCRIPTION OF A PREFERRED EMBODIMENT

Figure 1:
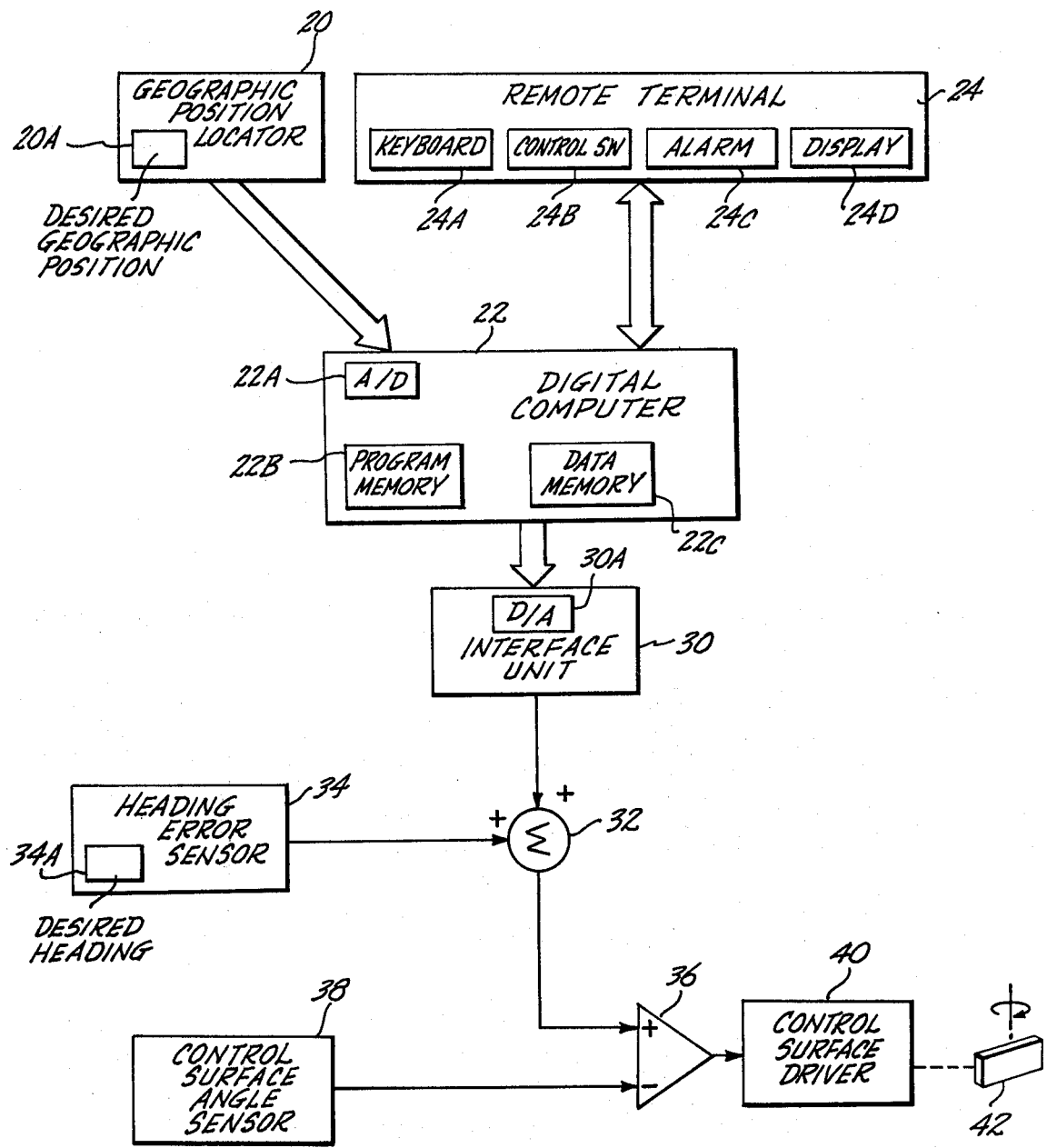
FIG. 1 is a block diagram illustrating a geographic position locator, the apparatus of the present invention, an electronic automatic pilot, and their functional interconnections.

With reference now to FIG. 1, a system for controlling the course of a vessel so as to maintain the vessel on a predetermined geographic track is illustrated, with all of the components of the system being physically located on the vessel. A geographic position locator 20 provides information, in the form of either analog or digital information signals, to a digital computer 22 which is also capable of interactive communications, by means of the interchange of digital signals, with a remote terminal 24 which is positioned so as to be accessible by an operator of the vessel. The geographic position locator 20 may comprise a depth sounder or a temperature sensor, in which case the information provided thereby represented measured water depth or measured water temperature. The geographic position locator 20 may also comprise an electronic navigation receiver such as a Loran-C receiver. In the simplest case, the information signal from the Loran-C receiver will represent the instantaneous geographic position of the vessel. In the case where the Loran-C receiver is of the autotracking type, an apparatus 20A is provided therein for the entry, by the operator, of information relating to the actual and a desired geographic position of the vessel, whereby the receiver computes a predetermined geographic track to the desired geographic position, and provides an information signal to the digital computer 22 which represents the sign and magnitude of cross-track error. In addition, Loran-C receivers, particularly of the autotracking type, are capable of providing information signals which signify loss of the ability of the receiver to determine cross-track error.

The remote terminal 24 includes a keyboard 24A and a control switch 24B, which permit the operator to transmit information to the digital computer, and an alarm 24C and a display 24D which function to allow the digital computer 22 to signify the existence of an alarm condition and other information pertinent to the operation of the system and to the entry of information by the operator.

The digital computer 22 includes an A/D converter 22A for converting any information signal that may be received in analog form from the geographic position locator 20 to an appropriate digital form, a program memory 22B which includes a set of stored program instructions, and a data memory 22C. All information obtained from the geographic position locator 20, or obtained from or sent to the remote terminal 24, or sent to an interface unit 30, is contained with the data memory 22C and is acted upon by the digital computer 22 in accordance with the set of program instructions contained within program memory 22B.

As explained in detail hereinafter, the set of stored program instructions causes the digital computer 22 to continuously monitor information obtained from the geographic position locator 20 and to develop therefrom a digital output signal representing the sign and magnitude of cross-track error. In the case where the geographic position locator 20 comprises a Loran-C receiver of the autotracking type, the digital computer 22 reformats the cross-track error information obtained from the geographic position locator 20 into a digital output signal whose format is suitable for the interface unit 30, and displays information relating to its operation by means of the display 24D in the remote terminal 24. In the cases where the geographic position locator 20 comprises another type of electronic navigational receiver, or a depth sounder, or a temperature sensor, the digital computer 22 utilizes geographic position information obtained from the geographic position locator 20, and desired course information provided by the operator through the use of the keyboard 24A in the remote terminal 24, to compute a desired geographic track, and to continuously compute and provide the digital output signal representing the sign and magnitude of cross-track error.

To obtain information from the operator required to determine cross-track error, and to obtain other information relating to the identity and type of the geographic position locator 20, the digital computer 22 engages in interactive communications with the operator by the transmission and display of questions to the remote terminal 24, utilizing the display 24D, and by the evaluation of responses made by the operator through use of keyboard 24A. The digital computer 22 may be placed in a "run" mode of operation whereby it undertakes vessel course control, or in a "stop" mode of operation, whereby it terminates vessel course control, in response to instructions of the operator through use of the control switches 24B. Upon detection of an alarm condition where instability is present in the information signal from the geographic position locator 20, or where the geographic position locator 20 transmits an information signal indicating loss of tracking, the digital computer 22 signifies that alarm condition to the operator by actuation of the alarm 24C, and is placed in a "stop" mode of operation.

The digital output signal from the digital computer 22 includes cross-track error information, and also includes information as to whether the digital computer 22 is in a "run" or a "stop" mode of operation. The interface unit 30, which is enabled only when the digital computer 22 is in a "run" mode of operation, includes a digital-to-analog converter 30A which functions to provide an analog cross-track error signal. After suitable amplitude scaling, the analog cross-track error signal is integrated, and the integrated signal is summed with the analog cross-track error signal, to develop a course correction signal which is supplied to a first input of a summing junction 32. A second input to the summing junction 32 comprises a heading error signal which is provided by a heading error sensor 34 in the electronic automatic pilot, with the sign and magnitude of the heading error signal being related to the angular deviation between the instantaneous magnetic heading of the vessel and a desired magnetic heading thereof (with the desired magnetic heading being set into the heading error sensor 34 by the operator of the vessel using apparatus 34A).

The course correction and heading error signals are additively combined in summing junction 32, whereby the output thereof comprises a corrected heading error signal that is supplied to the noninverting input of a differential amplifier 36. Supplied to the inverting input of differential amplifier 36 is a control surface angle signal which is obtained from a control surface angle sensor 38. The sign and magnitude of the control surface angle signal are related to the angular deviation between a control surface 42 of the vessel, such as the vessel's rudder, and the vessel's longitudinal axis. The output of differential amplifier 36 comprises a control surface position signal which is applied to a control surface driver 40 which responsively controls the position of the control surface 42.

The heading error sensor 34, the differential amplifier 36, the control surface angle sensor 38, and the control surface driver 40 comprise well known elements of an electronic automatic pilot particularly suited for marine applications, as disclosed in more detail in the aforementioned U.S. Pat. Nos. 3,906,641 and 3,946,691, and reference should be made to those patents for a complete description of the structure and operation thereof. For present purposes, it is sufficient to note that the electronic automatic pilot comprises a class 2 servocontrol system which is capable of very quickly altering the heading of a vessel, by appropriate positioning of the control surface 42, so as to continually reduce the magnitude of the heading error signal to maintain the actual heading of the vessel at or near the desired heading thereof. In the prior art, the heading error signal for the heading error sensor 34 is applied directly to the noninverting input of differential amplifier 36. In the present invention, the summing junction 32 is interposed in the signal connections between the heading error sensor 34 and the differential amplifier 36 to provide a corrected heading error signal which causes the electronic automatic pilot to not only continuously reduce the magnitude of the heading error signal so as to maintain the vessel in the right direction, but also to continuously reduce the magnitude of cross-track error so as to maintain the vessel on the desired geographic track.

Figure 7:
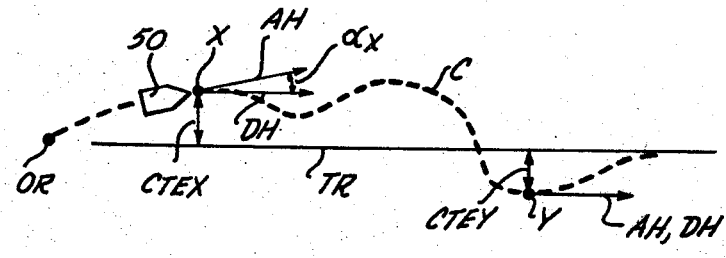
FIG. 7 is a pictorial diagram illustrating the course of a vessel with respect to a predetermined geographic track.

With reference now to FIG. 7, let it be assumed that a vessel 50 starts its travel at an arbitrary point of origin OR and thereafter traverses a course C under control of the system illustrated in FIG. 1. Let is also be assumed that the operator has entered information either into the geographic position locator 20, through apparatus 20A, or into the digital computer 22, using remote terminal 24, which permits either the geographic position locator 20 or the digital computer 22 to compute a desired geographic track TR to the desired geographic position. Let it be further assumed that the operator of the vessel has computed, and set into the heading error sensor 34 using apparatus 34A, a desired heading DH that is generally aligned with the track TR. At point X, the vessel 50 has laterally drifted to the left of the track TR by an amount represented by cross-track error CTEX and has a heading error $\alpha_X$ between its actual heading AH and the desired heading DH. As the vessel 50 thereafter proceeds on the course C, the system illustrated in FIG. 1 continuously seeks to reduce the magnitude of heading error and cross-track error.

In a heading error control system such as the prior art electronic automatic pilot, the system would continuously seek to bring the actual heading AH of the vessel 50 into correspondence with the desired heading DH thereof, but would not be capable of maintaining the course C of the vessel 50 on the desired track TR, as best illustrated at point Y at which the vessel 50 has a zero heading error but a cross-track error CTEY. Likewise, if a control system were to be responsive only to cross-track error, the actual heading AH would be constantly changing, in a random manner depending on the specific action of winds, waves and currents upon the vessel, and with a frequency of change much greater than the slow oscillation illustrated for the course C in FIG. 7. Also, the vessel 50 could be turned around completely so that the vessel 50 would thereafter proceed for a short while away from the desired geographical position, although along the track TR.

Figure 2:
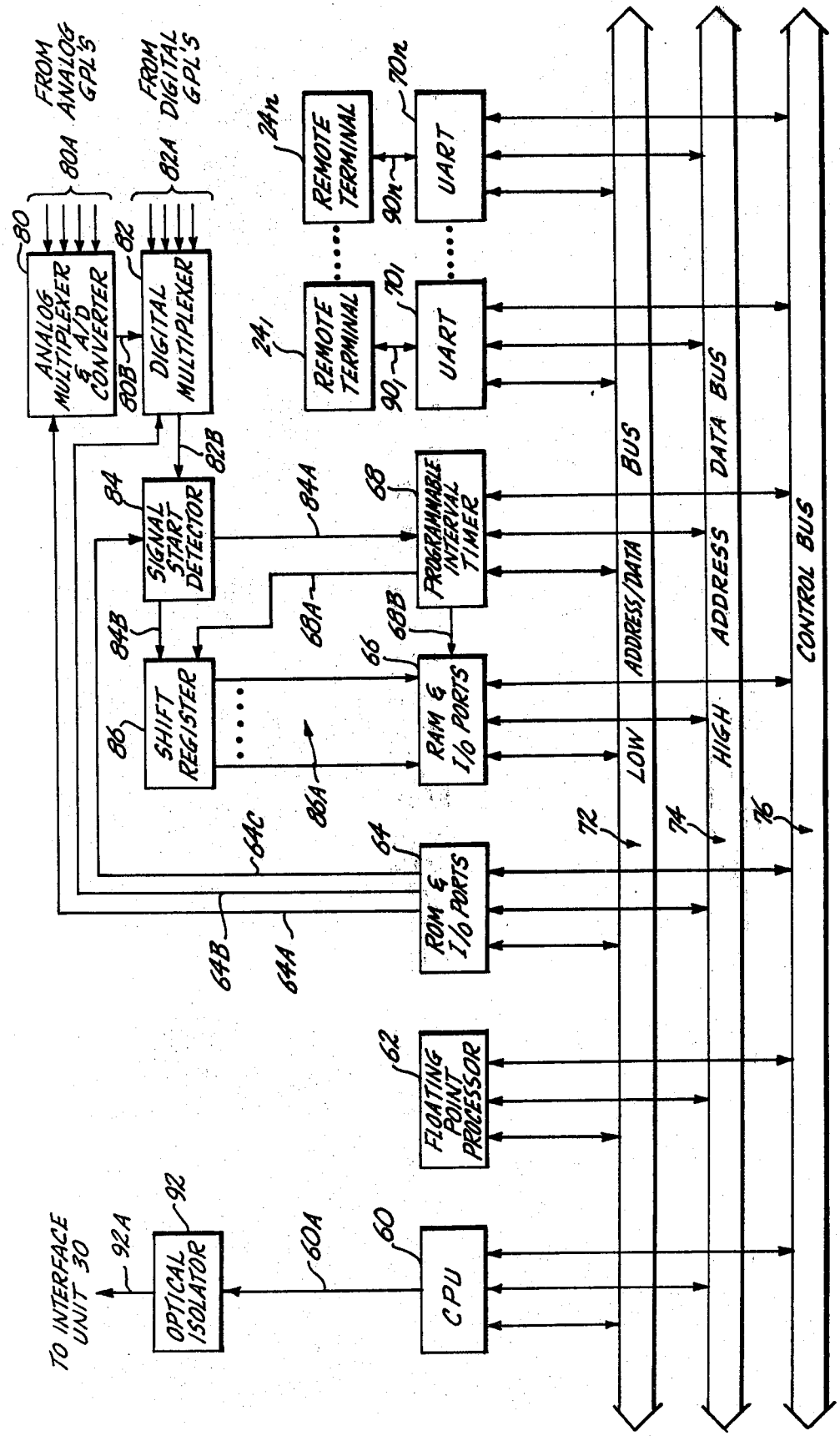
FIG. 2 is a block diagram of a preferred embodiment of a digital computer which is illustrated generally in FIG. 1.

With reference now to FIG. 2, a preferred embodiment of the digital computer 22 includes a plurality of integrated circuit chips consisting of a CPU (Central Processing Unit) 60, a floating point processor 62, a ROM (Read Only Memory) and I/O ports 64, a RAM (Random Access Memory) and I/O ports 66, a programmable interval timer 68, and a plurality of UARTs (Universal Asynchronous Receiver Transmitter) $70_1$-$70_n$. The forementioned integrated circuit chips are interconnected by a low address/data bus 72, a high address data bus 74, and a control bus 76, to form a microprocessor system, with the integrated circuit chips being commercially available from Intel Corporation with the following designations:

TABLE I

| Integrated Circuit Chip | Designation |
|---|---|
| CPU 60 | 8085 Microprocessor |
| Floating Point Processor 62 | 8741 Universal Peripheral Interface Microcomputer |
| ROM and I/O Ports 64 | 8755-A EPROM with I/O Ports |
| RAM and I/O Ports 66 | 8155 Static MOS RAM with I/O Ports and Timer |
| Programmable Interval Timer 68 | 8253-5 Programmable Interval Timer |
| UARTs $70_1$-$70_n$ | 8251-5 Universal Synchronous/Asynchronous Receiver/Transmitter |

The structure and operation of each integrated circuit chip is described in detail in the "Intel Component Data Catalog 1978", which is expressly incorporated by reference herein. Further, the overall operation of the microproccessor system, and the interconnection of the integrated circuit chips by means of the busses 72, 74 and 76, is conventional and will be apparent to those of ordinary skill in the art by reference to the "MCS-85 User's Manual", copyright 1977, Intel Corporation, which is also expressly incorporated by reference herein.

For present purposes, it is sufficient to note that the program memory 22B of the digital computer 22 consists of a set of program instructions which are stored in the ROM and I/O ports 64, with flow charts for the specific routines utilized being described hereinafter with respect to FIGS. 12-17. The data memory 22C of the digital computer 22 is contained within the RAM and I/O ports 66, and is organized as described hereinafter with respect to FIG. 11.

Within each routine, the program instructions are addressed and executed in a predetermined sequence by CPU 60. For each program instruction so addressed, the CPU 60 undertakes an instruction cycle, with each instruction cycle including a plurality of machine cycles. The machine cycles permit the CPU 60 to retrieve an instruction from the ROM and I/O ports 64, and to execute the instruction by the addressing and transmission of data to and from the CPU 60, the floating point processor 62, the RAM and I/O ports 66, and the UARTs $70_1$-$70_n$. In addition, machine cycles are provided which allow the CPU 60 to control the programmable interval timer 68 so as to synchronize the entry of data from a geographic position locator into the RAM and I/O ports 66. Within each machine cycle, the address of any instruction and/or data is signified by signals on the low address/data bus 72, the content of any instruction and/or data is signified by signals on the high address data bus 74, and all control signals are transmitted on the control bus 76 which includes a plurality of interrupt lines which permit the RAM and I/O ports 66 and the UARTs $70_1$-$70_n$ to signify to the CPU 60 that data is held thereby and is ready to be processed. Although all program instructions to be described hereinafter are executed by the CPU 60, it must be noted in th execution of some of these program instructions (most notably, the computation of cross-track error), the CPU 60 transmits data to and receives data from the floating point processor 62 which is provided with an integral program memory and data memory, whereby the floating point processor 62 is capable of carrying out certain complicated mathematical computations (such as the computation of a desired geographic track)a on the data transmitted thereto.

As previously described, the digital computer 22 receives information from the geographic position locator 20 and the remote terminal 24. In the embodiment of FIG. 2, the digital computer 22 is capable of receiving information from a plurality of geographic position locators which may provide either analog or digital information signals. The digital computer 22 accordingly includes an analog multiplexer and A/D converter 80 having a plurality of inputs, each of which is connected to a line 80A from one of a plurality of analog geographic position locators, not illustrated. In response to a select signal on lines 64A from ROM and I/O ports 64, analog multiplexer and A/D converter 80 is enabled to select one of the input lines 80A, to convert the analog information signal on the thus-selected line 80A into a corresponding serial digital signal, and to provide the corresponding digital signal on output line 80B to a digital multiplexer 82.

Digital multiplexer 82 also has a plurality of inputs, each of which is connected to a line 82A from one of a plurality of digital geographic position locators. In response to a select signal from ROM and I/O ports 64 on line 64B, digital multiplexer 82 is enabled to select one of the input lines thereto (lines 80B, 82A), and to couple any serial digital signal on the thus-selected input line to its output line 82B.

Output line 82B is coupled to the input of a signal start detector 84 whose output line 84B is coupled to the input of a shift register 86. Upon detection of the initiation of any serial digital signal on line 82B, signal start detector 84 provides an output signal on line 84A to programmable interval timer 68, which responsively provides a clock signal on line 68A to shift register 86 to allow the serial digital signal on line 82B, as passed through signal start detector 84, to be strobed into shift register 86 at a rate determined by the CPU 60, as described hereinafter. The signal start detector 84 also receives a signal, on line 64C from ROM and I/O ports 64, which is used to invert the logic levels of the serial digital signal provided to shift register 86 on line 84B if required.

Shift register 86 has a plurality of output lines 86A upon which appear the successive data bits of the serial digital signal stored therein, and which are coupled to corresponding inputs of RAM and I/O ports 66. After a time sufficient to all the serial digital signal to be completely strobed into shift register 86, programmable interval timer 68 provides a signal on line 68B to RAM and I/O ports 66 which enables the RAM and I/O ports 66 to latch therein the successive data bits appearing on output lines 86A. Further details regarding the entry of input data from the geographic position locators is given hereinafter with reference to FIGS. 3, 8 and 9.

In the embodiment of FIG. 2, each of the UARTs $70_1$-$70_n$ is interconnected by a corresponding line $90_1$-$90_n$ with one of a corresponding plurality of remote terminals $24_1$-$24_n$. By appropriate placement of the remote terminals $24_1$-$24_n$ throughout the vessel, the operator of the vessel can engage in interactive communications with the digital computer 22 as desired and without having to return to a single remote terminal location. Details of the structure of a preferred embodiment of each remote terminal is given hereinafter with reference to FIGS. 5 and 6.

CPU 60 provides a digital output signal on line 60A to an optical isolator 92, which provides a corresponding digital output signal on line 92A to interface unit 30. The digital output signal from CPU 60 includes information as to the mode of operation of the digital computer 22, i.e., whether in a "run" mode or in a "stop" mode, and further includes information as to the sign and magnitude of cross-track error. The structure and operation of interface unit 30 is explained in more detail hereinafter with reference to FIG. 4 and 10.

Figure 3:
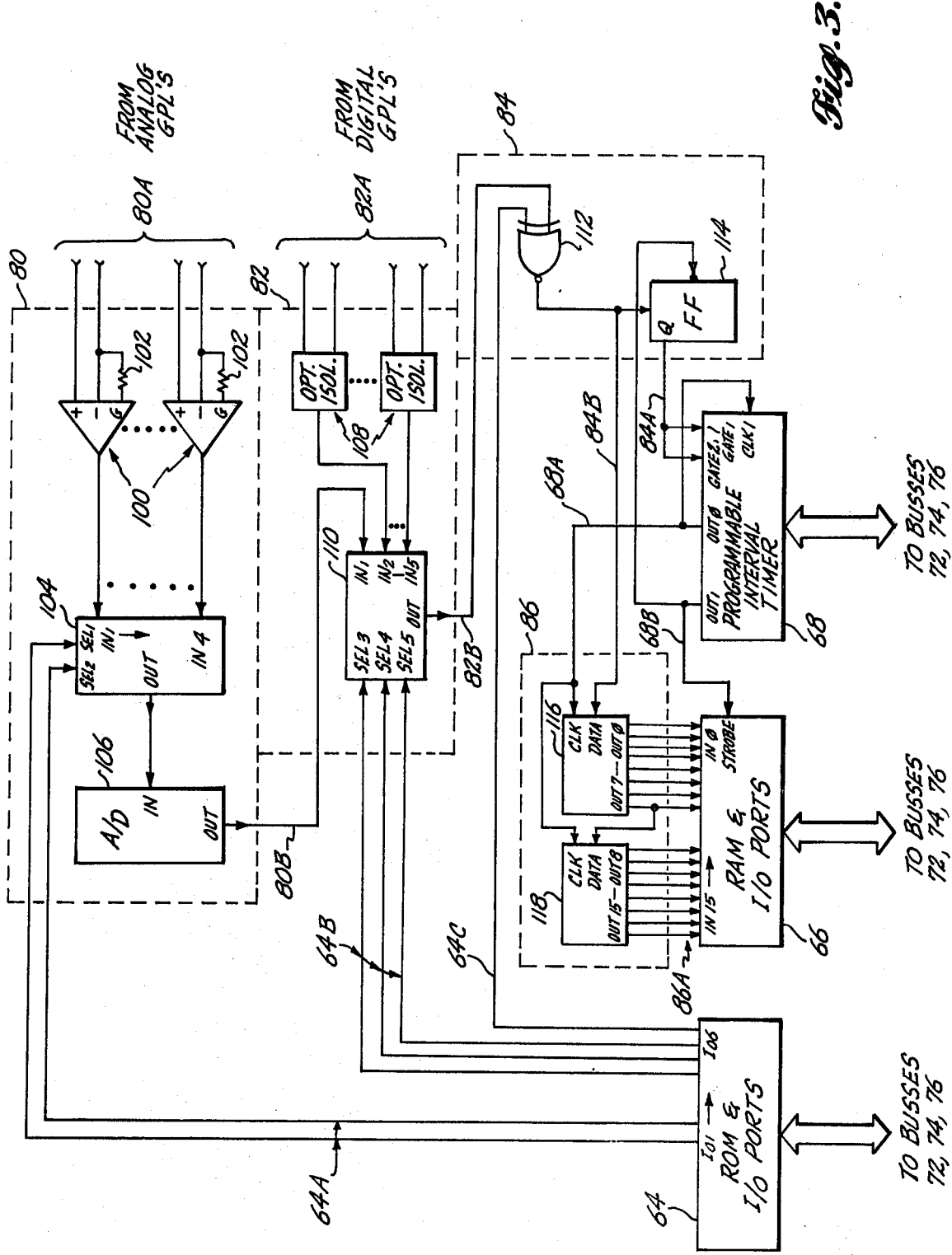
FIG. 3 is a detailed block diagram of a preferred embodiment of a portion of the digital computer in FIG. 2 which is adapted to receive digital and analog information signals from a plurality of geographic position locators.

With reference now to FIG. 3, there are two lines 80A from each analog geographic position locator which are connected to respective inverting and noninverting inputs of one of a plurality of isolation amplifiers 100 within analog multiplexer and A/D converter 80. Each isolation amplifier 100 functions to isolate the ground of its respective analog geographic position locator from the ground of the digital computer 22, and provides an output signal (whose gain is adjusted by a resistance 102 coupled from the inverting input of each isolation amplifier 100 to a gain (G) input thereof) whose polarity and magnitude correspond to that of the analog information signal supplied thereto. The output signals from the plurality of isolation amplifiers 100 are applied to respective signal inputs IN1–IN4 of an analog multiplexer 104. In addition, analog multiplexer 104 has two select inputs SEL1, SEL2 (which are connected to first and second select outputs 101, 102) of ROM and I/O ports 64 by select lines 64A. Analog multiplexer 104 has a single output which is connected to the input of an A/D converter 106, and is operative to couple one of its signal inputs IN1–IN4 to its output in response to the select signal provided by ROM AND I/O ports 64. The select signal is determined by the digital computer 22 as described hereinafter.

Figure 9A:
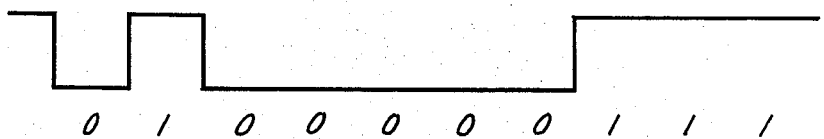
FIG. 9(a) is a signal diagram of a digital signal produced by the apparatus of FIG. 3 from an analog information signal provided by a geographic position locator.

Let it be assumed that the analog geographic position locator that has been so selected is an analog Loran-C receiver of the autotracking type. The analog information signal therefrom constitutes an analog voltage whose waveform, with respect to time, is a replica of the actual course C of the vessel (FIG. 7), with the polarity of the analog voltage, as present at the output of the corresponding isolation amplifier 100, representing the sign of cross-track error, and with the amplitude of the analog voltage representing the magnitude of cross-track error. For example, at point X in course C, the analog voltage will be positive and will have a magnitude corresponding to the cross-track error CTEX. A/D converter 106 converts this analog voltage, at a predetermined sampling rate, into a corresponding serial digital signal on line 80B. As illustrated in FIG. 9(a), the digital signal on line 80B consists of a 10-bit NRZ (nonreturn to zero) data word in offset binary notation in which the first bit is a start bit, always at a low logic level, the second bit is a sign bit, representing the direction of cross-track error, and the suceeding eight bits are data bits representing the magnitude of cross-track error. In the embodiment of FIG. 3, the following conventions are followed: a positive analog voltage, and a "1" sign bit represents vessel course deviation to the left of the track TR, and a negative analog voltage, and a "0" sign bit represent vessel course deviation to the right of the track TR. The data word illustrated in FIG. 9(a) corresponds to the sampled analog voltage at point X (FIG. 7), at which the vessel 50 has deviated to the left of the track TR by a cross-track error CTEX of seven arbitrary units. Accordingly, the sign bit in FIG. 9(a) represents "1", and the data bits represent the number "seven".

The lines 82A from the plurality of digital geographic position locators comprise a pair of such lines for each digital geographic position locator, each pair of which is connected to a respective one of a plurality of optical isolators 108. Each of the optical isolators 108 functions to isolate the ground of its associated digital geographic position locator from the ground of the digital computer 22, but otherwise provides a serial digital signal on its output which corresponds to the digital information signal received thereby. Although the format of the digital information signals will vary, depending upon the type of digital geographic position locator, such signals typically have a serial, digital format. For example, the digital information signal provided by the Loran-C autotracking receiver manufactured and sold by Digital Marine Electronics Corporation, and identified as the Northstar 6000 automatic Loran-C receiver, comprises a succession of 16-bit data words, in RZ (return to zero) form and in offset binary notation. Each data word includes an initial 8-bit DATA ID byte, representing an identification of the data that is being transmitted, and a subsequent 8-bit DATA byte, representing the data. The DATA ID bytes comprise: STATUS, which signifies that the data relates to the operation of the Loran-C receiver; CROSS-TRACK ERROR, which signifies that the data comprises information as to cross-track error; and, POSITION, which signifies that the data comprises information as to the actual position of the vessel. In the case where the DATA ID byte is STATUS, the DATA byte is either MANUAL, SNR, or CYCLE, each representing loss of tracking by the Loran-C receiver, or is GPL CALIB, representing the arbitrary units of CROSS-TRACK ERROR or POSITION (e.g., in feet, miles, fathoms, meters, etc.). In the case where the DATA ID byte is CROSS-TRACK ERROR, the DATA byte comprises an initial sign bit, and seven succeeding bits representing the magnitude of cross-track error.

Figure 8A:
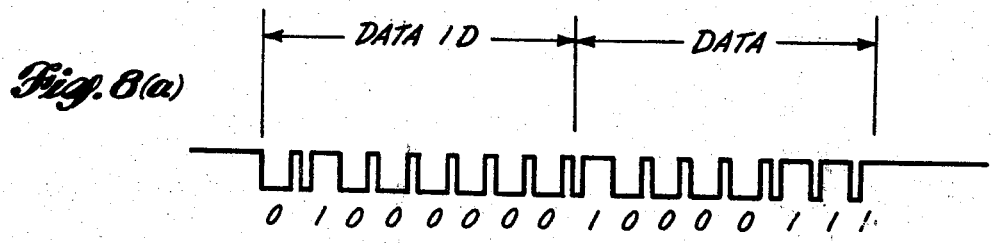
FIGS. 8(a) and 8(b) are signal diagrams illustrating one form of a digital information signal provided by a geographic position locator.
Figure 8B:
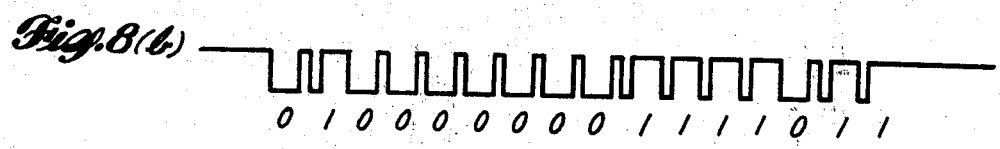

With reference now to FIGS. 8(a) and 8(b), representative digital information signals provided by a digital geographic position locator at points X and Y on the course C (FIG. 7) are illustrated. The initial bit of the DATA ID byte is a "0" start bit, and the succeeding seven bits represent the data identification, in this case "1000000" for CROSS-TRACK ERROR. The DATA byte comprises an initial sign bit ("1" in FIG. 8(a) representing vessel course deviation to the left of the track TR at point X, and "0" in FIG. 8(b) representing vessel course deviation to the right of the track TR at point Y), and the succeeding seven bits represent the magnitude of cross-track error ("0000111" in FIG. 8(a) for the cross-track error CTEX of 7 arbitrary units at point X, and "1111011" in FIG. 8(b) for a cross-track error CTEY of 5 arbitrary units at point Y).

Referring again to FIG. 3, the line 80B and the outputs from the plurality of optical isolators 108, are connected to respective inputs IN1 and IN2–IN5 of a digital multiplexer 110. Digital multiplexer 110 has a single output, and is operative to couple one of its inputs IN1–IN5 to its output under control of the select signal which is present on outputs I03–I05 of ROM and I/O ports 64 and which are respectively connected to select inputs SEL3–SEL5 of digital multiplexer 110 by select lines 64B. Therefore, a serial digital signal (e.g., FIGS. 8(a) or 9(a)) appears on the output of digital multiplexer 110 and is coupled by line 82B to a first input of an EXCLUSIVE-OR gate 112 within signal start detector 84. A second input of EXECUSIVE-OR gate 112 is connected to output 106 of ROM and I/O ports 64 by select line 64C. In some cases, the logic levels in the digital information signal from a geographic position locator may be inverted from that required by the digital computer 22. Accordingly, the select signal or select line 64C causes EXECLUSIVE-OR gate 112 to either invert or not invert the logic levels of digital signal on line 82B.

The output digital signal from EXCLUSIVE-OR gate 112 is applied to a present input of a flip-flop 114 within signal start detector 84, and is also coupled by line 84B to a DATA input a shift register 86. In the embodiment of FIG. 3, the shift register 86 comprises cascaded 8-bit shift registers 116, 118 required to provide signal storage for a 16-bit digital word. At the initial high-low logic level transition in the digital signal on the output of EXCLUSIVE-OR gate 112, representing the start bit in each data word, flip-flop 114 is set, whereby its Q input goes to a high logic level. The signal on the Q output of flip-flop 114 is coupled to GATE 1 and GATE 2 inputs of programmable interval timer 68. When the Q output of flip-flop 114 goes to a high logic level, first and second counters (not illustrated) within programmable interval timer 68 are enabled, whereby outputs OUT$\phi$ and OUT1 of programmable interval timer 68 initially go to a high logic level. OUT$\phi$ is coupled to a CLK1 input of programmable interval timer and by line 68A to respective CLK inputs of shift registers 116, 118. OUT1 is coupled to a reset input of flip-flop 114, and by line 68B to a STROBE input of RAM and I/O ports 66.

Figure 8C:
FIG. 8(c) is a signal diagram of a clock signal produced and used by the apparatus of FIG. 3 in decoding such a digital information signal.
Figure 9B:
FIG. 9(b) is a signal diagram of a clock signal produced and used by the apparatus of FIG. 3 in decoding such a digital signal.

Subsequently, OUTφ has present thereon a clock signal, as illustrated in FIGS. 8(c) and 9(b), whose repetition rate is determined by the CPU 60 from the identity of the geographic position locator whose data is being received. The clock signal on OUTφ has a 50% duty cycle, so that each high-low logic level transition therein falls midway between each successive high-low logic level transition in the output digital signal from EXCLUSIVE-OR gate 112. The shift registers 116, 118 are responsive to each high-low logic level transition in the clock signal on OUTφ so as to shift therein the successive bits of each data word in the output digital signal from EXCLUSIVE-OR gate 112.

A third counter provided within programmable interval timer 68 is responsive to CLK1 so as to count the pulses within the clock signal on OUTφ. When a predetermined number of pulses have been produced (in the example under consideration, 16), this third counter causes OUT1 of programmable interval time 68 to go to a low logic level, whereby flip-flop 114 is reset. As a result, the Q output of flip-flop 114 goes to a low logic level, terminating the production of the clock signal on OUTφ and thereby terminating the shifting of bits into the shift registers 116, 118. The bits of the data words are presented at outputs OUT15–OUTφ of shift registers 118, 116, which are coupled by lines 86A to corresponding signal inputs IN15–INφ of RAM and I/O ports 66. When OUT1 goes to a low logic level, the RAM and I/O ports 66 is enabled, through the STROBE input thereof, to store therein, in parallel format, the data word in shift registers 118, 116 (e.g., the data word in FIG. 9(a) or either of the data words in FIGS. 8(a) and 8(b)).

After storing each data words, the RAM and I/O ports 66 signifies to CPU 60 that input data has been received (by a signal on an input data interrupt line forming part of the control bus 76). Thereafter, further processing of the input data word is accomplished by CPU 60, as discussed hereinafter.

The additional components illustrated in FIG. 3 are available in the form of integrated circuit chips from a number of sources, the following of which are representative:

TABLE II

| Component | Manufacturer and Type |
|---|---|
| Isolation Amplifiers 100 | Analog Devices 288 |
| Analog Multiplexer 104 | RCA CD4052-B |
| A/D Converter 106 | Analog Devices AD7530 |
| Optical Isolators 108 | Lytronics IL-100 |
| Digital Multiplexer 110 | RCA CD4051-B |
| Shift Registers 116, 118 | RCA CD4015-B |

Figure 10A:
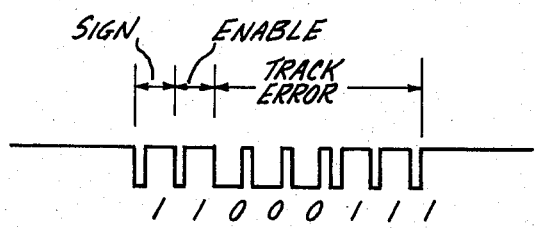
FIGS. 10(a) and 10(b) are signal diagrams of digital output signals provided by the digital computer.
Figure 10B:
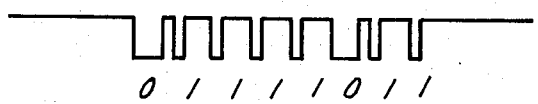

The digital output signal from CPU 60, as coupled through optical isolator 92 and as present on line 92B, includes a succession of 8-bit serial data words each having a predetermined format in offset binary notation, examples of which are illustrated in FIGS. 10(a) and 10(b). The initial bit is a SIGN bit, which represents the direction of cross-track error, the succeeding bit is an ENABLE bit, which contains an instruction to the interface unit 30 as to the mode of operation of the digital computer 22, and the remaining six bits comprise a TRACK ERROR byte, which represents the magnitude of cross-track error. FIG. 10(a) corresponds to FIG. 8(a) and therefore represents the digital output signal from signal from CPU 60 at point X on course C (FIG. 7), and FIG. 10(b) corresponds to FIG. 8(b) and therefore represents the digital output signal from CPU 60 at point Y on course C.

Figure 4:
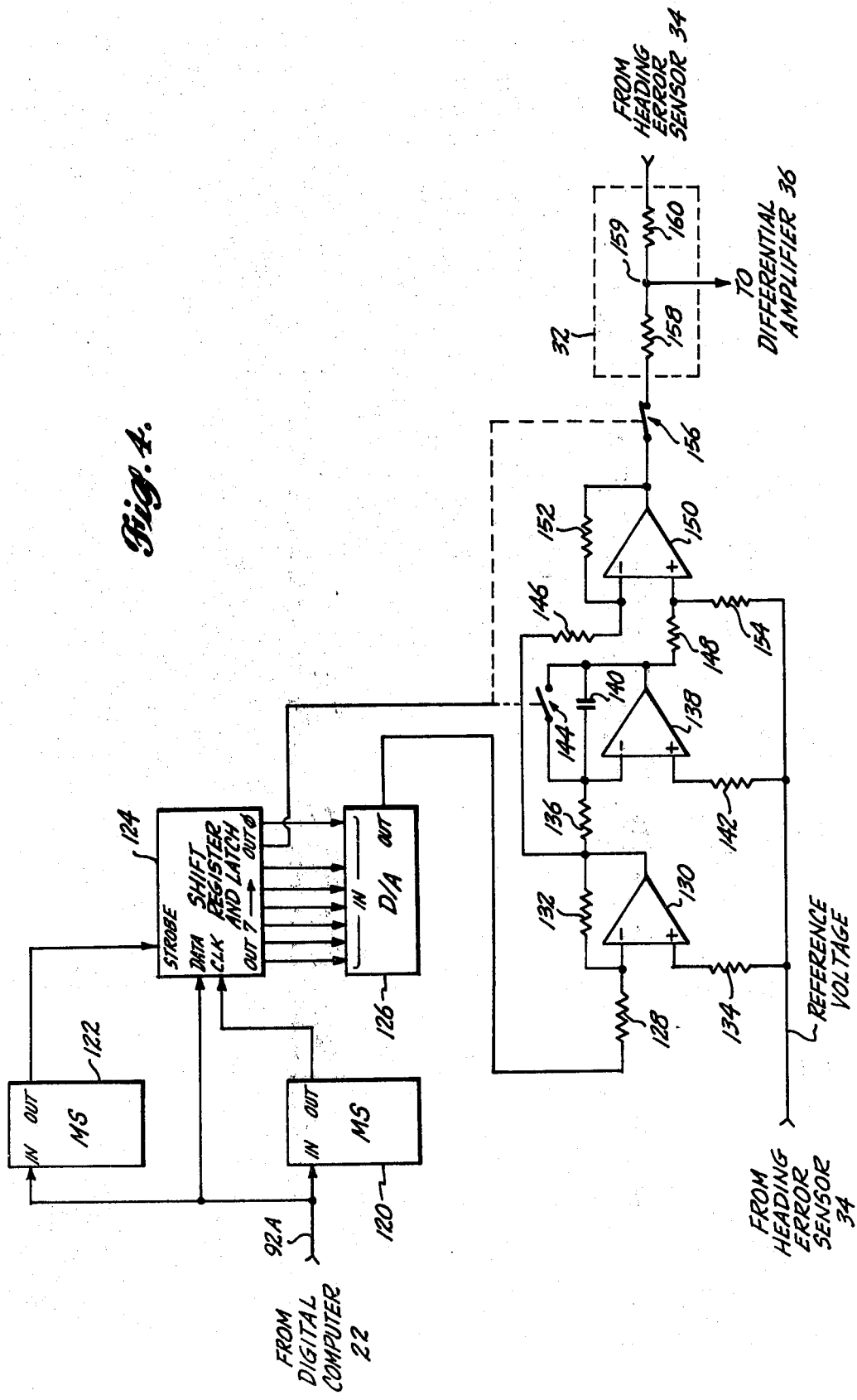
FIG. 4 is a detailed block diagram of a preferred embodiment of an interface unit which is illustrated generally in FIG. 1.

With reference now to FIG. 4, the digital output signal on line 92A is applied to respective inputs of monostable multivibrators 120, 122 and to the DATA input of a shift register and latch 124. The outputs of monostable multivibrators 120 and 122 are respectively coupled to the CLK and STROBE inputs of shift register and latch 124. Shift register and latch 124 has a plurality of outputs OUT7–OUTφ, of which outputs OUT7–OUT2 and OUTφ are coupled to respective inputs of a D/A converter 126. Output OUT1 of shift register and latch 124 is coupled to control inputs of semiconductor switches 144, 156, which are symbolized in FIG. 4 respectively as normally-open and normally-closed mechanical switches.

Figure 10C:
FIGS. 10(c) and 10(d) are signal diagrams of clock signals used by the interface unit of FIG. 4 in decoding such digital cross-track error signals.
Figure 10D:
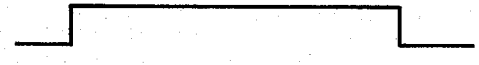

When the digital output signal on line 92A undergoes an initial high-low logic level 0 transition, monostable multivibrators 120, 122 are enabled. In response to each high-low logic level transition in the digital output signal on line 92A, monostable multivibrator 120 provides an output pulse which terminates approximately midway before the next high-low logic level transition in the digital output signal on line 92A. The output signal from monostable multivibrator 120 therefore comprises a clock signal, as seen in FIG. 10(c), which serves to shift the successive bits of each data word into successive stages of the shift register and latch 124. When monostable multivibrator 122 is enabled, the output thereof goes to and remains at a high logic level 1 for a time greater than the expected duration of each such data word, as illustrated in FIG. 10(d). When the output of monostable multivibrator 122 subsequently goes to a low logic level, the successive bits of the data word within shift register and latch 124 are latched and presented to outputs OUT7–OUTφ. Accordingly, the signals on outputs OUTφ and OUT2–OUT7 represent the SIGN bit and the TRACK ERROR byte, respectively, and the signal on OUT1 represents the ENABLE bit.

D/A converter 126 converts the signals presented thereto by shift register and latch 124 into a corresponding analog voltage whose polarity is determined by the SIGN bit and whose magnitude is determined by the TRACK ERROR byte. The analog voltage on the output of D/A converter 126 is coupled by a resistor 128 to the inverting input of an operational amplifier 130. A resistor 132 couples the output of operational amplifier 130 to the inverting input thereof, and a resistor 134 couples the noninverting input of operational amplifier 130 to a reference voltage which is preferably also the reference voltage for the components of the heading error sensor 34 (e.g., the voltage on lead 123, FIG. 4 of U.S. Pat. Nos. 3,806,641 and 3,946,691). Operational amplifier 130, and resistor 132, 134 comprise a high-gain, inverting amplifier, with the values of resistors 132 and 134 being chosen to appropriately scale the magnitude of the analog voltage appearing on the output of operational amplifier 130.

This analog voltage, which is proportional to cross-track error, is coupled by a resistor 136 to the inverting input of an operational amplifier 138. A capacitor 140 and semiconductor switch 144 are connected in parallel between the output of operational amplifier 138 and the inverting input thereof, and a resistor 142 is coupled from the noninverting input of operational amplifier 138 to the reference voltage. With semiconductor switch 144 opened as illustrated in FIG. 4, operational amplifier 138, capacitor 140 and resistor 142 comprise an integrator whose output is an analog voltage proportional to the time integral of the analog voltage on the output of operational amplifier 130, and thus to the time integral of cross-track error.

The analog voltage on the output of operational amplifier 130 is coupled to the inverting input of an operational amplifier 150 by a resistor 146, and the analog voltage on the output of operational amplifier 138 is coupled to the noninverting input of operational amplifier 150 by a resistor 148. A resistor 152 is coupled from the output of operational amplifier 150 to the inverting input thereof, and a resistor 154 is coupled from the noninverting input of operational amplifier 150 to the reference voltage. Operational amplifier 150, and resistors 152, 154, function as a summing amplifier, of unity gain, whereby the analog voltage on the output of operational amplifier 150 represents the sum of crosstrack error and of the time integral of cross-track error.

With semiconductor switch 156 being closed as illustrated in FIG. 4, the analog voltage on the output of operational amplifier 150, which comprises the course correction signal, is coupled to the summing junction 32, and specifically, by a resistor 158 to a common summing node 159 therein. The heading error signal from the heading error sensor 34 likewise is coupled to the common summing node 159 by a resistor 160. The signal on common summing node 159 therefore comprises the corrected heading error signal and is used to adjust the position of the control surface or rudder 42 as previously described with reference to FIG. 1.

By summing cross-track error with the time integral of cross-track error in the interface unit 30, and by correcting the heading error signal in accordance with such a sum, a system as illustrated in FIG. 1 is more capable of maintaining the vessel on the desired geographic track than if the heading error signal were to be corrected only in response to cross-track error. To illustrate this point, reference may be made to two situations commonly encountered.

In the first such situation, the vessel has been subjected to fairly strong and constant lateral forces which have caused the vessel to laterally drift from the desired geographic track. Assuming that the course correction signal from interface unit 30 is proportional only to cross-track error, it will be seen that as the system in FIG. 1 controls the course of the vessel so as to return the vessel to the desired geographic track, the magnitude of the course correction signal decreases. As a result, the correction that is made to the heading error signal in response to cross-track error, and the corresponding control action by the control surface or rudder 42, also decreases. As the vessel approaches the desired geographic track, a point will be reached at which the corrective action (related to cross-track error) afforded by the control surface or rudder 42 is too small to offset the fairly strong and constant lateral forces acting on the vessel. Thereafter, the system will bring the actual heading of the vessel will be brought into correspondence with the desired heading, and the vessel will proceed along a track which is parallel to the desired geographic track until a change occurs in the lateral forces acting on the vessel.

The time integral of cross-track error is of course related to the average of cross-track error over a predetermined time period. In the situation being discussed, the continued existence of cross-track error will cause the integrator output (the analog voltage on the output of operational amplifier 138) to increase, resulting in an increased course correction signal which allows the system in FIG. 1 to bring the vessel to the desired geographic track.

In the second such situation, let it be assumed that the vessel is not being subjected to fairly strong and constant lateral forces, but has nevertheless laterally drifted from the desired geographic track by an appreciable amount. Let it again be assumed that the course correction signal from interface unit 30 is proportional only to cross-track error. Due to the appreciable amount of lateral drift, the resultant initial value of the course correction signal will cause the vessel to approach the desired geographic track at an angle. Due to the vessel's momentum, the corrective action afforded by the control surface or rudder 42 in response to the heading error signal as the vessel approaches the desired geographic track is insufficient to change the instantaneous heading of the vessel, so that the vessel crosses the desired geographic track and drifts to the other side thereof. After the vessel crosses the desired geographic track, a cross-track error signal, of opposite polarity to that produced before the vessel crossed the desired geographic track, will be produced to result in a corresponding course correction signal from interface unit 30. When this course correction signal is combined with the heading error signal, the heading of the vessel will be altered, but the resultant momentum of the vessel will cause the vessel to again cross the desired geographic track at an angle. Therefore, if the course correction signal were to be proportional only to cross-track error, the course of the vessel would generally correspond to the desired geographic track, but would oscillate thereabout.

By making the course correction signal also related to the time integral of cross-track error, the cross-track error signal that is experienced after the vessel crosses the desired geographic track is offset by a signal of opposite polarity (represented by the time integral). As a result, the correction signal from interface unit 30 quickly goes to zero after the vessel crosses the desired geographic track, so that the heading of the vessel may be quickly brought into correspondence with the desired heading thereof in response to the heading error signal.

As can therefore be appreciated, the amount and type of correction that is made to the heading error signal in response to cross-track error can be varied by adjusting the gain of the high-gain amplifier including operational amplifier 130 and resistors 132, 134, by adjusting the integration time constant of the integrator including operational amplifier 138, capacitor 140 and resistor 142, and by adjusting the relative values of resistors 158 and 160.

When the digital computer 22 is in a "run" mode of operation, the ENABLE bit is a "1", whereby the semiconductor switches 144, 156 are controlled to the positions illustrated in FIG. 4. However, when the digital computer 22 is in a "stop" mode of operation, the ENABLE bit is a "0", whereby semiconductor switch 144 is closed and semiconductor switch 156 is opened. When semiconductor switch 156 is opened, the course correction signal is removed from the summing junction 32, whereupon the electronic automatic pilot controls the course of the vessel only in accordance with the heading error signal from heading error sensor 34. When semiconductor switch 144 is closed, a discharge path is provided for capacitor 140, whereupon the analog voltage on the output of the integrator including operational amplifier 138, capacitor 140 and resistor 142 goes to zero to condition the integrator for subsequent integration in the event that the digital computer 22 is again placed in a "run" mode of operation.

To this point, the apparatus of the present invention, and its operation, have been described in the simplest form, wherein the apparatus acknowledges and receives cross-track error information from a geographic position locator, reformats that cross-track error information into an appropriate digital output signal, converts the digital output signal into a corresponding analog voltage, and develops an analog course correction signal from the analog voltage. The apparatus of the present invention additionally has the capacity of engaging in interactive communications with the operator of the vessel for many purposes, including the selection of a specific geographic position locator, the entry of information which permits the computation of a desired geographic track, the enabling or disabling of the operation of the apparatus, and the signifying of an alarm condition.

Figure 5:
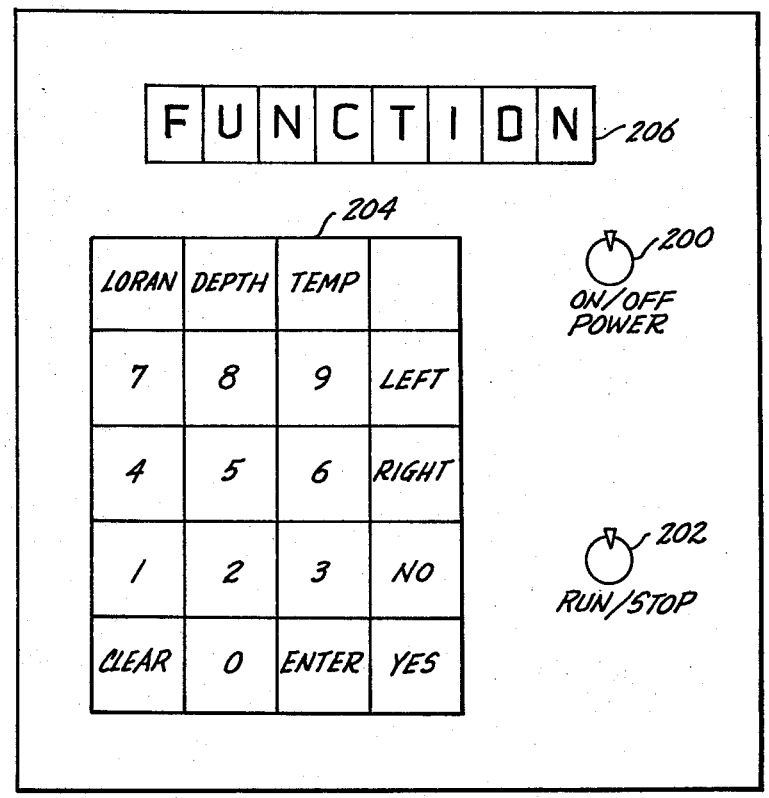
FIg. 5 is a pictorial representation of a preferred embodiment of a remote terminal which is illustrated generally in FIG. 1.

For the purpose of providing such interactive communications, each remote terminal $24_1$-$24_n$ includes a front panel, as illustrated in FIG. 5, on which are located an ON/OFF POWER switch 200 and a RUN/-STOP switch 202, both of which comprise the control switches 24B (FIG. 1). Also located on the front panel are a plurality of keys 204, which comprises the keyboard 24A, and which include the following keys:

TABLE III

| | |
|---|---|
| LORAN | |
| DEPTH | |
| TEMP | CPU Commands |
| CLEAR | |
| 0-9 | CPU Number |
| LEFT | |
| RIGHT | |
| NO | CPU Directives |
| YES | |
| ENTER | |

The front panel illustrated in FIG. 5 also includes a plurality of alpha-numeric character units 206, comprising the display 24D, with each character unit 206 preferably comprising a 7-segment LED (light emitting diode) or LC (liquid crystal) unit.

Figure 6:
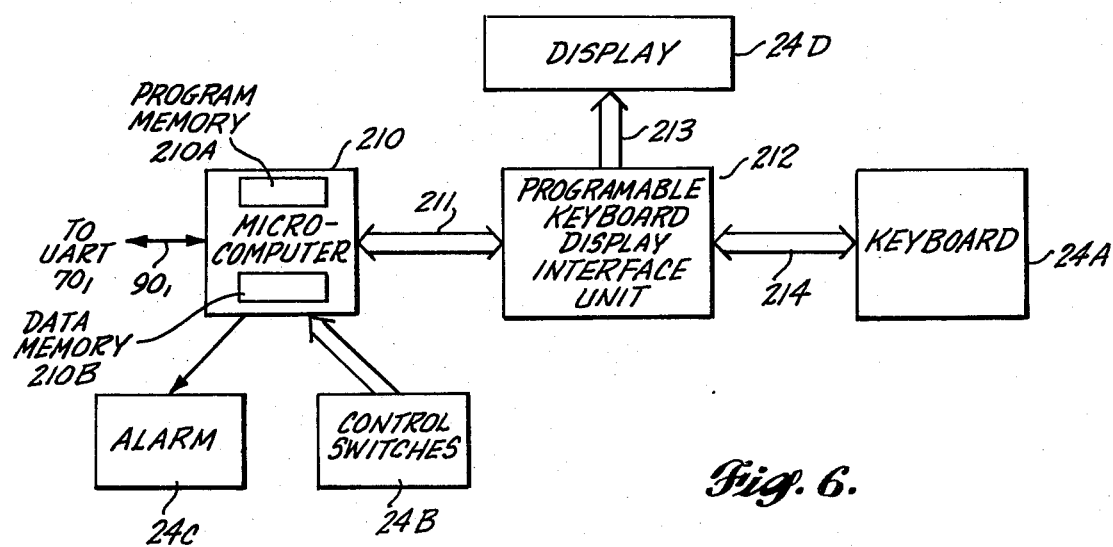
FIG. 6 is a block diagram of the remote terminal.

Each remote terminal $24_1$-$24_n$ also includes a plurality of integrated circuit chips which are functionally interconnected with the keyboard 24A, the control switches 24B, the alarm 24C and the display 24D as illustrated in FIG. 6. The integrated circuit chips include a microcomputer 210, which includes an input-/output port to which is connected the line from its corresponding UART (such as line $90_1$ from UART $70_1$). Microcomputer 210 also has an output port which is connected to the alarm 24C, and a plurality of input ports which are connected to the control switches 24B including ON/OFF POWER switch 200 and RUN/-STOP switch 202. A data bus and a plurality of control lines, symbolized by 211 in FIG. 6, extend between corresponding terminals of the microcomputer 210 and a programmable keyboard/display interface unit 212 to permit the microcomputer 210 and the programmable keyboard/display interface unit 212 to exchange data. In turn, the programmable keyboard/display interface unit 212 is interconnected by means of a plurality of lines 213 with the display 24D so as to permit the programmable keyboard/display interface unit 212 to transmit information to the display 24D to result in the display of a desired alpha-numeric data word using the character units 206. Likewise, a plurality of lines 214 interconnect the programmable keyboard/display interface unit 212 with the keyboard 24A and permit the programmable keyboard/display interface unit 212 to continuously scan and to detect the depression of any of the keys 204, and to formulate therefrom a corresponding data word.

Microcomputer 210 and programmable keyboard/display interface unit 212 comprise integrated circuit chips which are commercially available from Intel Corporation, with the following designations:

TABLE IV

| Integrated Circuit Chip | Designation |
|---|---|
| CPU 210 | 8048 8-bit Microcomputer |
| Programmable Keyboard/ Display Interface Unit 212 | 8279-5 Programmable Keyboard/ Display Interface |

The structure, general operation, and interconnections of the microcomputer 210 and programmable keyboard/display interface unit 212 will be apparent to those of ordinary skill in the art from reference to the aforementioned "Intel Component Data Catalog 1978".

Before further proceeding, it will be helpful to set forth a listing of the data words utilized by the CPU 60 and their origin and destination:

TABLE V

A. INPUT DATA WORDS FROM GEOGRAPHIC POSITION LOCATORS

| DATA ID | | DATA | |
|---|---|---|---|
| (1) | STATUS | (1) | MANUAL |
| | | | SNR |
| | | | CYCLE |
| | | | GPL CALIB |
| (2) | CROSS-TRACK ERROR | (2) | SIGN, MAGNITUDE |
| (3) | POSITION | (3) | GEO. COORD. |

B. INPUT DATA WORDS FROM UART
   (1) COMMAND (a) GPL FUNCTION  
         (i) LORAN  
         (ii) DEPTH     } FROM KEYBOARD 24A  
         (iii) TEMP  
      (b) CLEAR (c) RUN     } FROM SWITCH 202  
      (d) STOP

TABLE V-continued

| | | |
|---|---|---|
| (2) | NUMBER | FROM KEYBOARD 24A |
| (3) | DIRECTIVE | |
| | (a) ENTER | |
| | (b) YES | |
| | (c) NO | FROM KEYBOARD 24A |
| | (d) LEFT | |
| | (e) RIGHT | |

C. OUTPUT DATA WORDS TO UART
 (1) CPU QUESTION

|   |   |
|---|---|
| (a) FUNCTION | |
| (b) ISODEPTH? | |
| (c) ISOTHERM? | |
| (d) DEEPER? | |
| (e) WARMER? | |
| (f) LOP1? | TO DISPLAY 24D |
| (g) LOP2? | |
| (h) LOP3? | |
| (i) LOP4? | |
| (j) COURSE? | |

(2) CPU MODE

|   |   |
|---|---|
| (a) READY | |
| (b) LORAN TRACK | TO DISPLAY 24D |
| (c) DEPTH TRACK | |
| (d) TEMP TRACK | |
| (e) ALARM | TO ALARM 24C |

D. OUTPUT DATA WORD TO INTERFACE UNIT
 SIGN  ENABLE  TRACK ERROR

---

Returning now to each remote terminal $24_1$–$24_n$, the microcomputer 210 therein includes a program memory 210A and a data memory 210B. The program memory 210A contains a set of program instructions which causes the microcomputer 210 to function as a conventional, universal asynchronous receiver/transmitter and to thereby exchange data with its corresponding UART in the digital computer 22 in the form of serial digital data words in the well-known ASCII code. Acting upon this set of program instructions, the microcomputer 210 causes any data word sent to the digital computer 22, as listed in Table V, and any data words received from the digital computer 22, as also listed in Table V, to be temporarily stored in the data memory 210B. Further, the microcomputer 210 causes any of the data words produced by actuation by any one or more of the keys 204 on the keyboard 24A to be displayed by display 24D until the display 24D is cleared by the digital computer 22 as described hereinafter. The operation of each remote terminal $24_1$–$24_n$ can also be enabled or disabled, depending upon the setting of the ON/OFF POWER switch 200, which controls the application of power to and the removal of power from the components of the remote terminals $24_1$–$24_n$ illustrated in FIG. 6. Otherwise, the operation of each remote terminal $24_1$–$24_n$ is slaved to that of the digital computer 22, with the result that any data word entered into data memory 210B from keyboard 24A or RUN/STOP switch 202 is immediately sent to digital computer 22, and any data word entered into data memory 210B from digital computer 22 is immediately sent to either display 24D and displayed thereby, or to alarm 24C to cause the production of an audible alarm signal. Upon receipt of any data word from its corresponding remote terminal $24_1$–$24_n$, the associated UART $70_1$–$70_n$ provides a control signal on a UART data interrupt line in control bus 76 to thereby signify to CPU 60 that a data word is ready to be processed.

Figure 11:
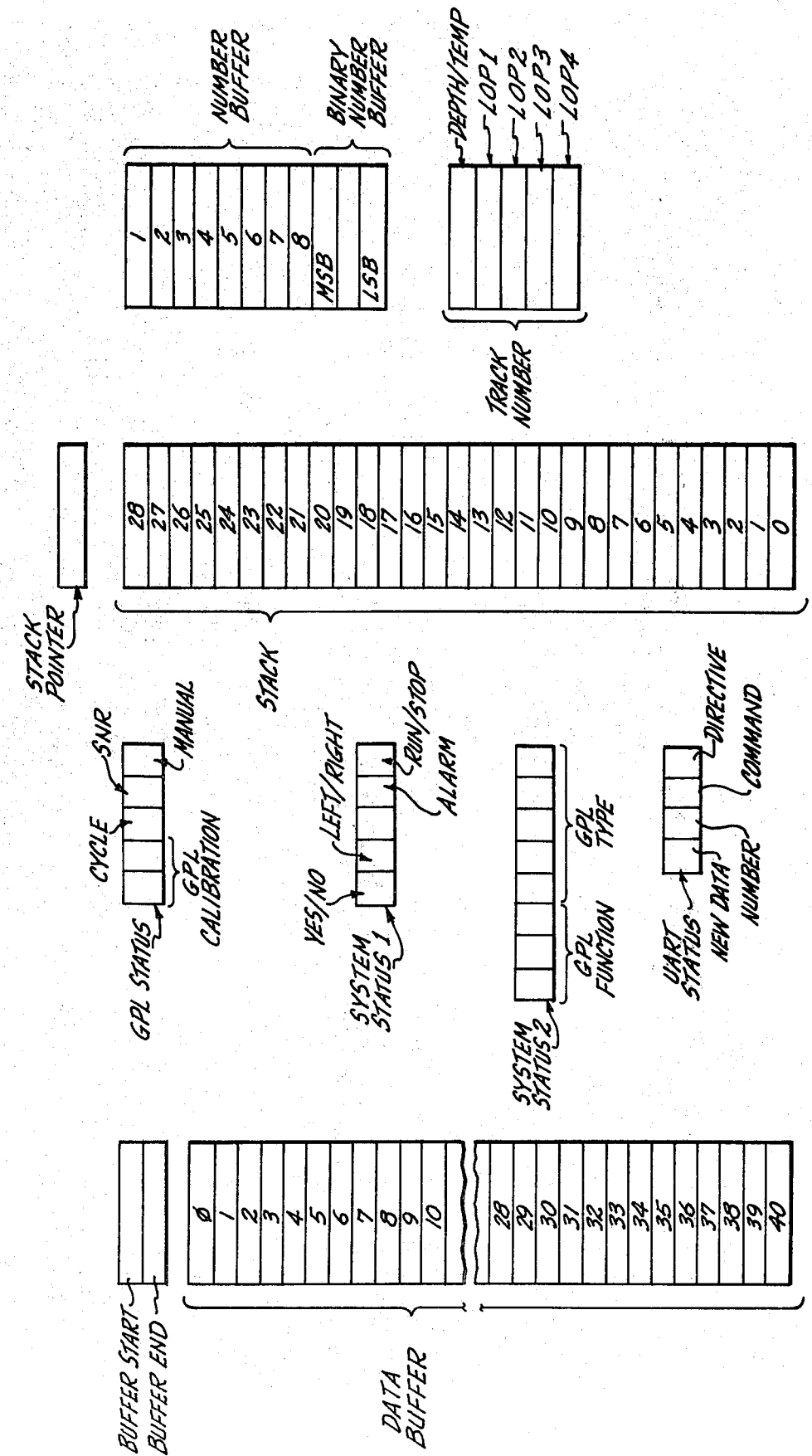
FIG. 11 is a schematic representation of various buffers and registers contained within the digital computer.

The data memory 22C (within RAM and I/O ports 66) is organized as illustrated in FIG. 11. Specifically, there is included a 40-byte data buffer for receiving and temporarily storing data words received from the UARTs $70_1$–$70_n$ and from the shift register 86 (which comprises those data words received from a geographic position locator), and for temporarily storing output data words to be sent to the interface unit 30. The data buffer is configured as a circulating register, with the address in the data buffer of the last data word processed being located in a buffer end register, and with the address in the data buffer of the next data word to be processed being located in a buffer start register. Also included is a 28-byte stack, or holding, register, which is used by CPU 60 to temporarily store certain information relating to the program step being executed by CPU 60 when a control signal appears on either the UART data interrupt line or the input data interrupt line in control bus 76. Upon the production of any such control signal, CPU 60 is programmed to immediately process either the UART data or input data signified thereby. Accordingly, the stack register is provided to provide temporary storage of information relating to the program step being executed by CPU 60, so that CPU 60 can return to that program step after processing of the UART data or input data. The stack register is also configured as a circulating register, with the address of the first byte in the program step then being executed being located in a stack pointer register.

Also included is a GPL status register, a system status 1 register, a system status 2 register, and a UART status register. The GPL status register includes a 2-bit GPL CALIBRATION byte, a CYCLE bit, an SNR bit, and a MANUAL bit, all of which are set in response to input data from a geographic position locator as described hereinafter. The system status 1 register includes a YES/NO bit, and a LEFT/RIGHT bit, both of which are set in response to corresponding directives in the UART data; a RUN/STOP bit which is set in response to a corresponding command in the UART data; and, an ALARM bit which is set upon the detection of an alarm condition in the input data. The system status 2 register includes a 3-bit GPL FUNCTION byte set by a corresponding command in the UART data, and a 5-bit GPL TYPE byte which is determined by CPU 60 as described hereinafter. The UART status register includes a NEW DATA bit, a NUMBER bit, a COMMAND bit, and a DIRECTIVE bit. Upon the production of a control signal on the UART data interrupt line, the NEW DATA bit is set, and one of the NUMBER, COMMAND or DIRECTIVE bits may be set, depending upon whether the UART data is a number, command or directive.

Also included is an 8-byte number buffer which is used for temporary storage of one or more number data words in the UART data, and a 3-byte binary number buffer, which is used for storage of binary numbers computed by CPU 60 from one or more of the number data words in the number buffer, as described hereinafter.

Finally, there is included a 5-byte track number register, which provides storage for DEPTH/TEMP, LOP1, LOP2, LOP3, and LOP4 bytes, each comprising a binary number obtained from the binary number buffer, as described hereinafter.

As is conventional, each of the registers in FIG. 11 has associated therewith a unique address in RAM and I/O ports 66 to thereby allow CPU 60 to retrieve information therefrom and to store information therein.

Figure 12:
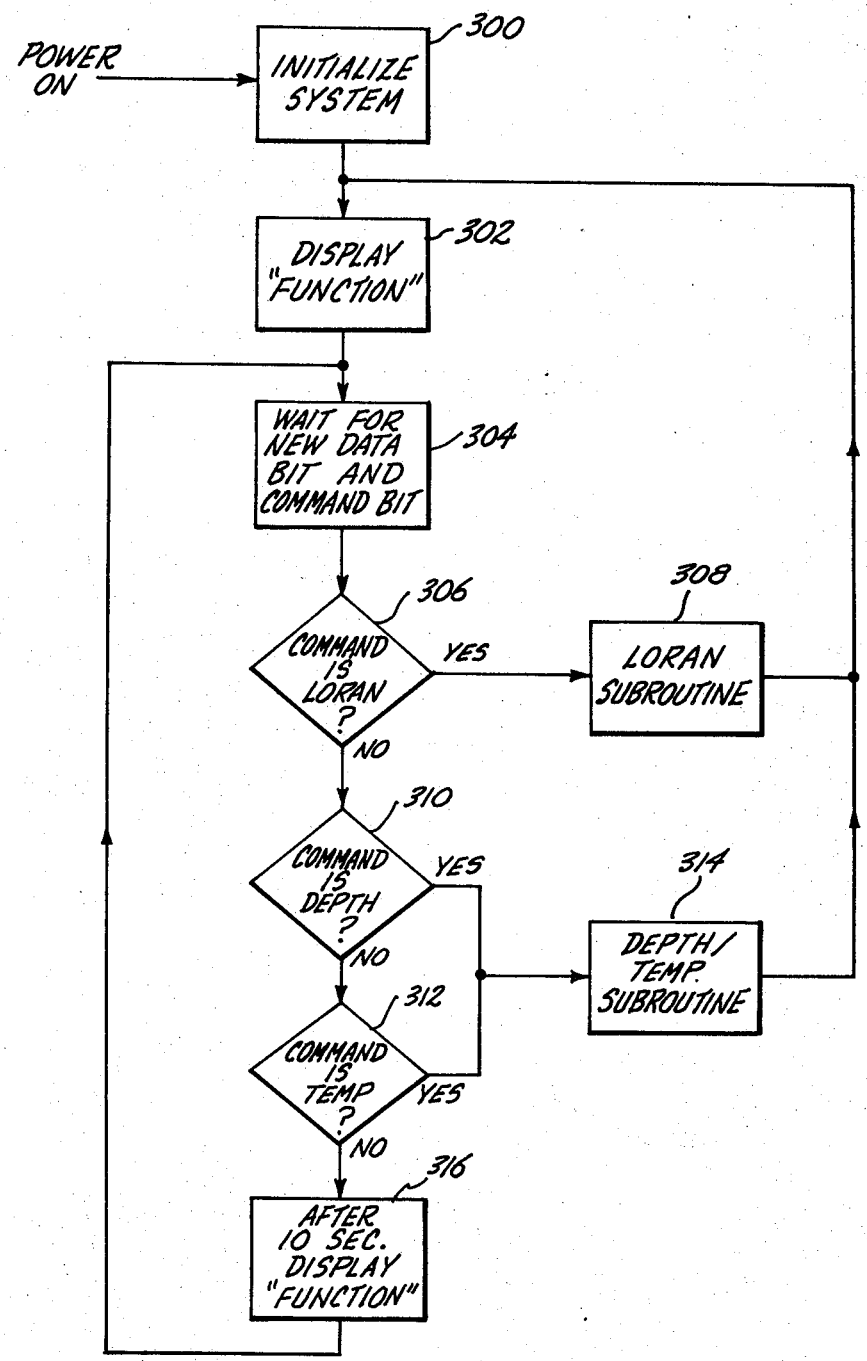
FIG. 12 is a flow chart illustrating the program steps undertaken by the digital computer in a main program loop.

With reference now to FIG. 12, the application of power to the digital computer 22 results in the detection, by CPU 60, of a POWER ON condition. As a result, CPU 60 enters an initialize system routine 300 in which the various registers in data memory 22A (FIG. 11) are cleared, the UARTs $70_1$–$70_n$ are conditioned for the reception of UART data, and the RAM and I/O ports 66 and the programmable internal timer 68 are conditioned for the reception of input data. Also, the RUN/STOP bit in the system status 1 register is set to STOP, whereby the ENABLE bit in each data word in the digital output signal from CPU 60 is set to "0" to thereby disable the interface unit 30 as previously described. In addition, the input data interrupt line in the control bus 76 is disabled (by masking) so that CPU 60 is not capable of processing any input data received from any of the geographic position locators.

After completing the initialize system routine 300, CPU 60 proceeds to step 302, in which CPU 60 poses a question to the operator by transmission of the FUNCTION data word to each of the remote terminals $24_1$–$24_n$ and resultant display thereby. CPU 60 then proceeds to step 304 and awaits a response to this question from the operator. Specifically, CPU 60 in step 304 looks at the UART status register to detect the setting of the NEW DATA bit and the COMMAND bit therein.

As previously described, the entry of any data into one of the remote terminals $24_1$–$24_n$ by the operator results in the production of a corresponding data word thereby. When such a data word is received by the associated one of the UARTs $70_1$–$70_n$, a control signal is provided on the UART data interrupt line in control bus 76 which causes CPU 60 to enter the UART data interrupt subroutine illustrated in FIG. 13. In step 350, CPU 60 transfers the data word from the UART to the data buffer in RAM and I/O ports 66. In step 352, CPU 60 conducts a test to determine if the UART data is a command (Table V). If the determination is negative, CPU 60 proceeds to the remainder of the UART data interrupt subroutine, to be described hereinafter. If the determination is positive, however, CPU 60 proceeds to step 354, wherein the NEW DATA bit and COMMAND bit in the UART status register are set, and thereafter exits from the UART data interrupt subroutine and returns to the pertinent portion of the main program loop (FIG. 12).

The operator will have been instructed to respond to the question posed by the display of the FUNCTION data word, by actuating either the LORAN, DEPTH or TEMP keys on keyboard 24A to signify the selection of a particular type of geographic position locator. Therefore, in step 306 in the main program loop (FIG. 12), a test is made to determine if the command in the UART data is the LORAN data word. If the determination is positive, CPU 60 proceeds to a Loran subroutine 308, which is described in detail hereinafter with reference to FIG. 14. If the determination is negative, however, CPU 60 proceeds, in steps 310 and 312, to determine if the command in the UART data is either DEPTH or TEMP. If the result of either of these determinations is positive, CPU 60 proceeds to a depth/temp subroutine 314, which is described in detail hereinafter with reference to FIG. 16. If the determinations in steps 310 and 312 are both negative (e.g., the operator has selected one of the other commands listed in Table V, such as RUN), CPU 60 then proceeds, in step 316, to wait for a period of ten seconds, during which the command is displayed by means of the display 24D, and then causes the display of the FUNCTION data word, and returns to step 304 to proceed as previously described. At this point, it should be noted that when CPU 60 has completed main program loop processing of any data word in the UART data, the bits in the UART status register are reset (e.g., the NEW DATA bit and COMMAND bit are reset when CPU 60 goes from step 306 to the Loran subroutine 308).

Let it be assumed that the operator has actuated the LORAN key. CPU 60 then proceeds to the Loran subroutine 308 (FIGS. 14(a) and 14(b)), and initially enters step 400, in which the GPL FUNCTION byte in the system status 2 register is set to correspond to the LORAN data word. In step 402, CPU 60 proceeds to scan the geographic position locator input lines 80A, 82A (by appropriate control of the select signals on select lines 64A, 64B so that the shift register 86 is caused to successively contain data words representative of the analog and digital information signals on input lines 80A, 82A), until a data word whose format is that of a data word from a Loran type of geographic position locator is detected. In this regard, there may be provided a series of predetermined data word formats in an appropriate look-up table in ROM and I/O ports 64, and data word detection in step 402 may be accomplished by comparing the format of the data words successively appearing in shift register 86 with the prestored formats in ROM and I/O ports 64. In step 404, CPU 60 determines the specific type of geographic position locator whose information signal contains the thus-selected data word. Specifically, the bit length, repetition rate, and specific format of the thus-selected data word is compared with prestored information in ROM and I/O ports 64. When comparison is effected, CPU 60 causes a corresponding code to be stored as the GPL TYPE byte in the system status 2 register.

In step 406, CPU 60, using the GPL TYPE byte in the system status 2 register, sends information to the programmable interval timer 68, obtained from a look-up table in ROM and I/O ports 64, which is used to set the first and second counters therein to establish the repetition rate of the clock signal on OUT$\phi$ thereof, and to set the third counter therein to establish the time duration of the signal on OUT1 thereof, as required for proper decoding of input data from the thus-selected geographic position locator.

In step 408, a test is made to determine if the thus-selected geographic position locator has the capability of providing cross-track error information (by comparing the GPL TYPE byte in the system status 2 register with a look-up table in ROM and I/O ports 64). If the determination is negative, CPU 60 proceeds to a Loran cross-track error subroutine 410 described in more detail hereinafter with reference to FIGS. 17(a)–17(d). If the determination is positive, CPU 60 proceeds to step 412, wherein the READY data word is transmitted to and displayed by the remote terminals $24_1$–$24_n$. CPU 60 then proceeds to step 414, and waits for the NEW DATA bit and the COMMAND bit in the UART status register to be set, thus requiring the operator to make a response to the question posed by the displayed READY data word.

Figure 13:
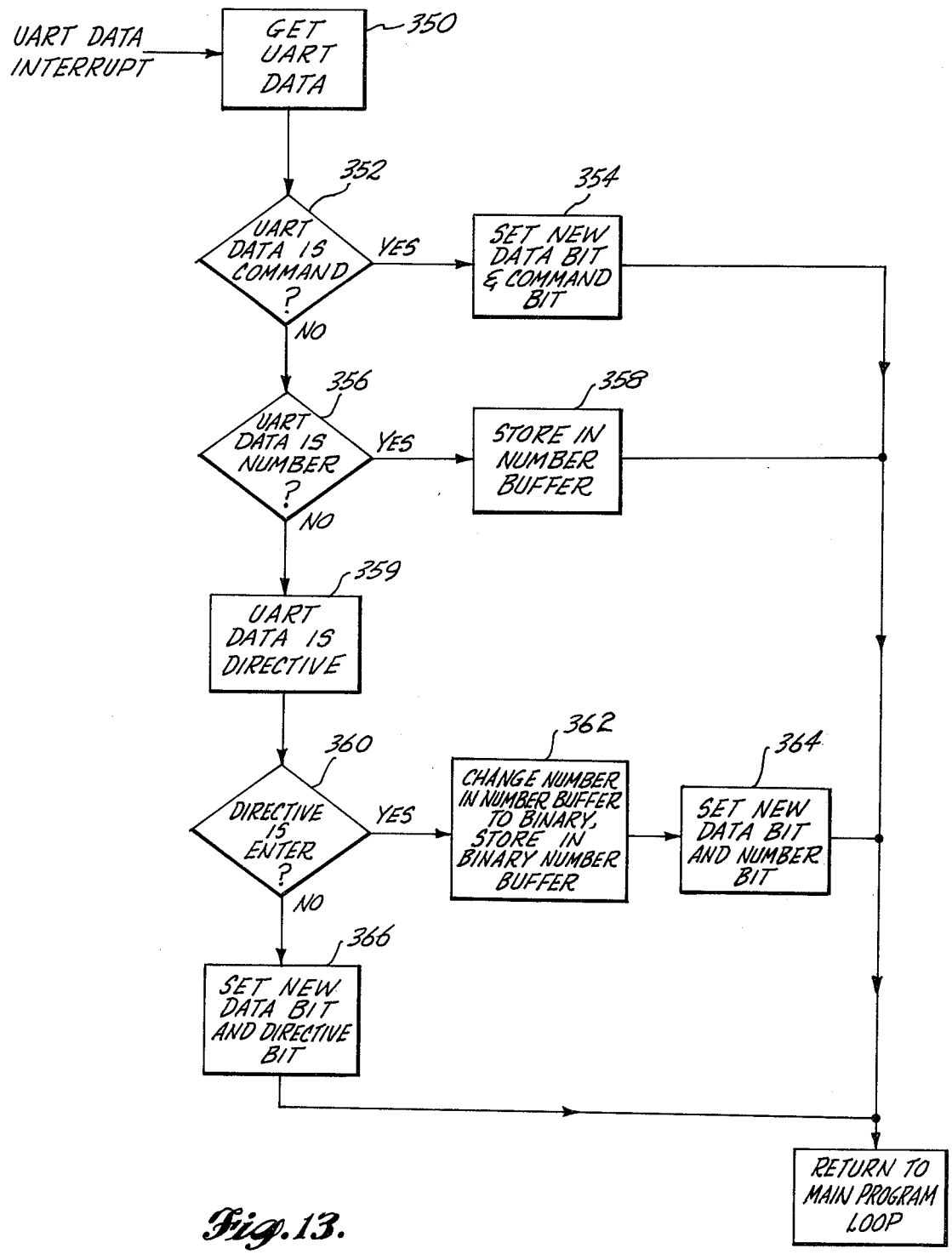
FIG. 13 is a flow chart of the program steps undertaken by the digital computer in a "UART data interrupt" subroutine.

Let it be assumed that the operator desired the digital computer 22 to assume control of the vessel's course. In such a case, the operator will respond by placing the RUN/STOP switch 202 to the "RUN" position to result in the production of the RUN data word. In response, the NEW DATA bit and COMMAND bit in the UART status register are set and the command is stored in the data buffer, as previously described with reference to the UART data interrupt subroutine (FIG. 13). In step 416, CPU 60 runs a test to determine if the command is the RUN data word. If the determination is positive, the RUN/STOP bit in the system status 1 register is set to RUN, in step 418, and the LORAN TRACK data word is transmitted to and displayed by each of the remote terminals $24_1$–$24_n$, in step 420. Thereafter, the digital computer 22 assumes control of the vessel's course as described hereinafter.

Let it be assumed, however, that the operator has caused a command other than that represented by the RUN data word to be entered into the digital computer 22. Accordingly, the determination in step 416 is negative, whereupon CPU 60, in step 422, makes a test to determine if the entered command is the CLEAR data word. If the result of this test is negative, CPU 60, in step 424, waits for ten seconds, resulting in display of the thus-entered command for that time period, and then returns to step 412, wherein the READY data word is again displayed to signify to the operator that a proper response is required. If the determination in step 422 is affirmative, however, CPU 60 proceeds to step 426 wherein a test is made to determine if the NEW DATA bit and COMMAND bit are again set within a period of ten seconds. If the determination in step 426 is affirmative, a test is made in step 428 to determine if the command thus received is that represented by the LORAN data word. If the determination in step 428 is also affirmative, CPU 60 exits from the Loran subroutine 308 back to the main program loop (FIG. 12) and specifically to step 302 wherein the FUNCTION data word is displayed. Accordingly, the operator, by the successive actuation of the CLEAR and LORAN keys within a period of ten seconds, has the capability of selecting another type of geographic position locator. If the determinations in either of steps 426 or 428 are negative, however, CPU 60 does not exit from the Loran subroutine 308, but rather returns to step 412 whereupon the READY data word is displayed to signify that a proper response is required.

When the RUN/STOP bit in the system status 1 register is set to RUN in step 418, the ENABLE bit in each output data word in the digital output signal from CPU 60 is set to "1" whereby the interface unit 30 is enabled. After display of the LORAN TRACK data word in step 420, CPU 60 proceeds in step 430 to enable the input data interrupt line in the control bus 76 (by unmasking that line) so that CPU 60 is thereafter responsive to process any input data from the selected geographic position locator.

Figure 15:
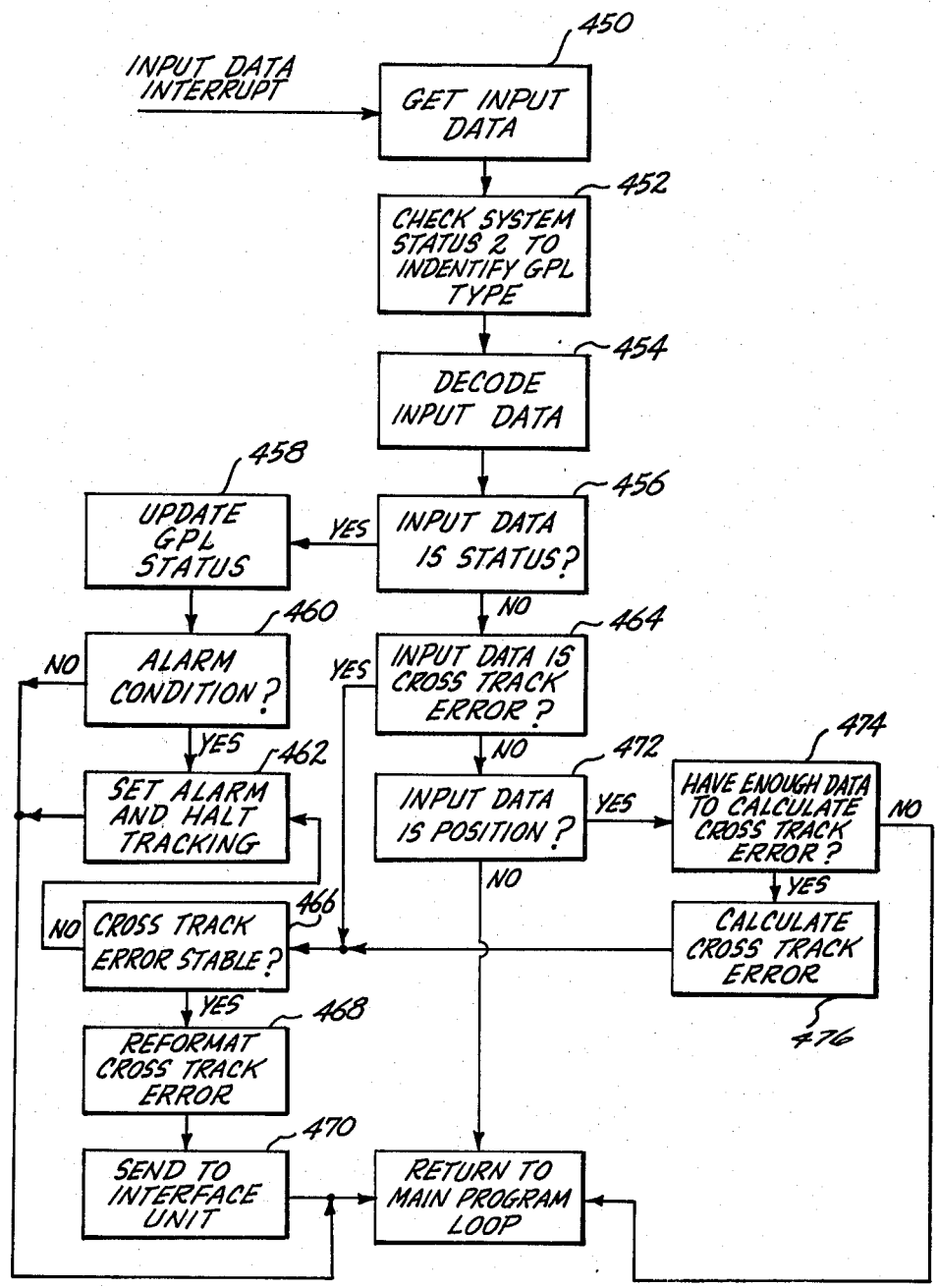
FIG. 15 is a flow chart of the program steps undertaken by the digital computer in an "input data interrupt" subroutine.

With reference now to FIG. 15, each control signal on the input data interrupt line causes CPU 60, in step 450, to transfer each data word signified thereby into the data buffer in RAM and I/O ports 66. In step 452, CPU 60 investigates the GPL TYPE byte in the system status 2 register, and uses this information in step 454 to decode the data word in the input data, again using the look-up table in the ROM and I/O ports 64. For the data words listed in Table V, the decoding in step 454 simply comprises determining whether the DATA ID byte comprises the STATUS word, the CROSS-TRACK ERROR word, or the POSITION word.

In step 456, a test is made to determine if the STATUS word is present. If the determination in step 456 is positive, CPU 60 proceeds, in step 458, to update the GPL status register in accordance with the DATA byte in the input data. In step 460, a test is made to determine if the DATA byte represents an alarm condition (that is, the presence of the CYCLE, SNR, or MANUAL data words). If the determination in step 460 is negative (e.g., the DATA byte comprises the GPL CALIB data word in the case where the operator has changed the arbitrary units of cross-track error or position by appropriate manipulation of the geographic position locator 20), CPU 60 simply returns to the main program loop (in this case, step 430 in the Loran subroutine 308) and awaits the transmission of additional input data from the geographic position locator. If the determination in step 460 is positive, however, CPU 60 in step 462 sets the ALARM bit in the system status 1 register, as a result of which CPU 60 transmits the ALARM data word to the remote terminals $24_1$–$24_n$ for actuation of the alarm 24C therein, and additionally sets the RUN/STOP bit in the system status 1 register to STOP, whereby the ENABLE bit in the digital output signal from CPU 60 is set to "0" to disable the interface unit 30 and to therefore terminate control of the vessel's course by the digital computer 22. Thereafter, CPU 60 returns to the main program loop.

If the determination in step 456 is negative, CPU 60, in step 464, makes a test to determination if the DATA ID byte comprises the CROSS-TRACK ERROR data word. If the determination in step 464 is positive, CPU 60 proceeds to step 466, in which a test is made to determine if the cross-track error information obtained from the geographic position locator (or computed by CPU 60 from position information supplied by the geographic position locator as described hereinafter) is stable. In this regard, CPU 60, by means not illustrated, continually computes a time-averaged cross-track error, according to a well-known equation for time-averaged error, and compares the cross-track error with a predetermined threshold. If the time-averaged cross-track error exceeds the predetermined threshold for a certain time period, e.g., 20 seconds, an instability condition is detected by CPU 60.

If the determination in step 466 is negative, e.g., an instability condition has been detected, CPU 60 proceeds in step 462 to set the ALARM bit, and to halt tracking by setting the ENABLE bit in the digital output signal from CPU 60 to "0" as previously described. If the determination in step 466 is positive, e.g., an instability condition has not been detected, CPU 60 proceeds in step 468 to reformat the cross-track error information in the DATA byte to the format of the output data word, and in step 470 to send its digital output signal (FIGS. 10(a), 10(b)) to the interface unit 30 for subsequent vessel course control, as previously described. Thereafter, CPU 60 returns to the main program loop.

If the determination in step 464 is negative, CPU 60 proceeds, in step 472, to conduct a test to determine if the DATA ID byte in the input data comprises the POSITION data word. If the determination is step 472 is negative, as would be the case where the geographic position locator 20 is of the type that provides cross-track error information, CPU 60 returns to the main program loop. However, if the determination in step 472 is positive, as would be the case where the geographic position locator is not of the type that is capable of providing cross-track error information, CPU 60 proceeds to step 474, in which a determination is made as to whether the information contained in the DATA byte is, along with other information obtained by CPU 60, sufficient to calculate cross-track error. If the determination in step 474 is negative, CPU 60 returns to the main program loop to await further input data. If the determination in step 474 is positive, however, CPU 60, in step 476, proceeds to the calculation of cross-track error information, and then goes to step 466 to treat the cross-track error information as previously described.

Returning now to FIG. 14(b), CPU 60 will remain in step 430 until the operator has placed the RUN/STOP switch 202 in the STOP position. Accordingly, the display 24D will display the LORAN TRACK data word. Further, the operator will be apprised of an alarm condition through actuation of the alarm 24C. At this point, it should be noted that since the input data interrupt line is not disabled upon the existence of an alarm condition, CPU 60 will continue to monitor input data received from the geographic position locator. Therefore, if a situation giving rise to the alarm condition ceases to exist (e.g., where the DATA ID byte from the geographic position locator comprises either the CROSS-TRACK ERROR data word or the POSITION data word, or where the cross-track error information is stable), CPU 60 responds to such input data as illustrated in FIG. 15 to therefore resume control of the vessel's course and additionally terminates actuation of the alarm 24C.

Returning again to FIG. 14(b), CPU 60, in step 432, looks at the UART status register to detect the presence of a NEW DATA bit and COMMAND bit therein. Upon such detection, CPU 60, in step 434, makes a test to determine if the command comprises the STOP data word. If the determination is negative, CPU 60 proceeds, in step 436, to wait for a period of ten seconds (thereby resulting in the display of the command for that period) and then proceeds to step 420 to proceed as previously described. If the determination is positive, however, CPU 60, in step 438, sets the RUN/STOP bit in the system status 1 register to STOP, which causes the ENABLE bit in the digital output signal from CPU 60 to be set to "0", thereby disabling the interface unit 30, and disables the input data interrupt line (by masking) in step 440. CPU 60 then returns to step 412, whereby the READY data word is displayed. Thereafter, the operator has the option of returning the digital computer 22 to a "run" mode of operation or of selecting another type of geographic position locator, in the manner previously described.

Referring now back to FIG. 12, let it be assumed that CPU 60 is in step 302, whereby the FUNCTION data word is displayed, and that the operator responds to this question by actuation of either the DEPTH or TEMP keys in keyboard 24A. As a result, CPU 60 proceeds to the depth/temp subroutine 314 illustrated in FIGS. 16(a)–16(c).

Figure 14A:
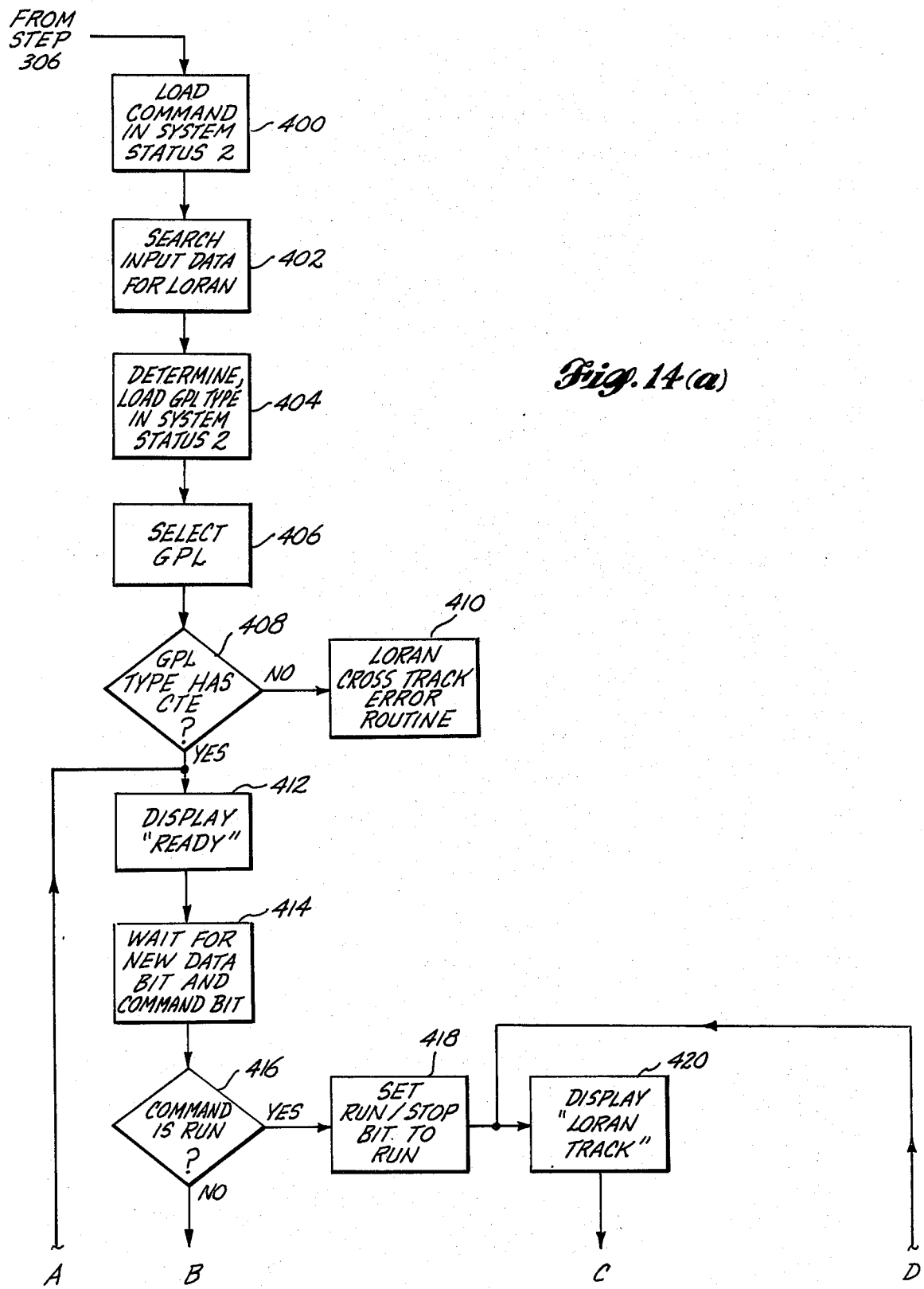
FIG. 14, consisting of FIGS. 14(a) and 14(b) is a flow chart of the program steps undertaken by the digital computer in a "Loran" subroutine.
Figure 14B:
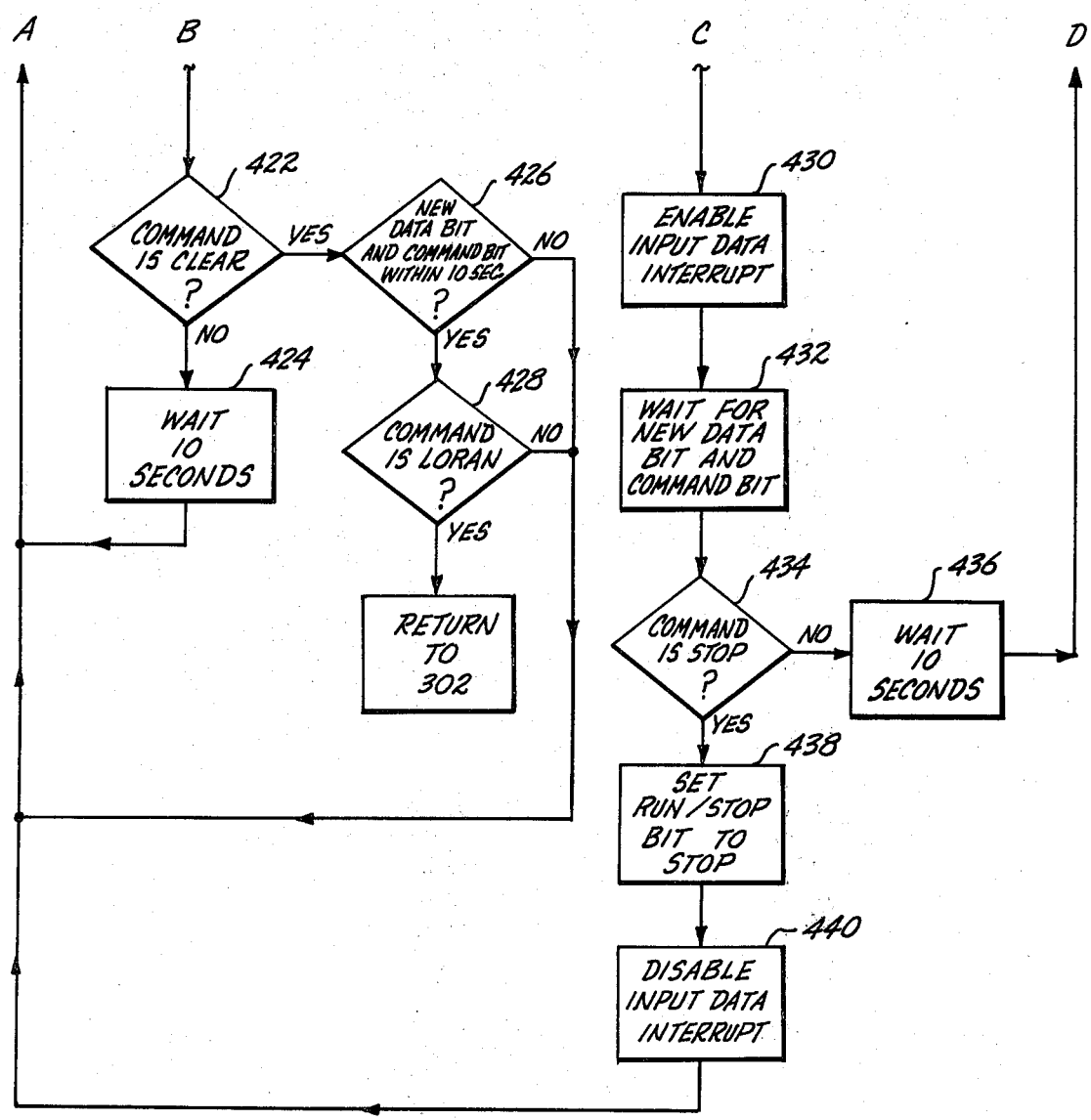

In steps 500, 502, 504 and 506, CPU 60 undertakes steps identical to those in steps 400, 402, 404, and 406 in the Loran subroutine 308 (FIG. 14(a)), and accordingly: loads the command in the system status 2 register (the GPL FUNCTION byte is set to either DEPTH or TEMP); scans the geographic position locator input lines for an information signal resembling depth or temp information; determines and loads the geographic position locator type in the system status 2 register (the GPL TYPE byte is set to a specific code); and, selects the geographic position locator by sending appropriate information to the programmable interface counter 68 and by supplying appropriate select signals on select lines 64A, 64B from ROM and I/O ports 64.

CPU 60 then proceeds to step 508, wherein either the ISODEPTH? word or the ISOTHERM? data word, depending upon the GPL FUNCTION byte, is transmitted to and displayed by each of the remote terminals $24_1$–$24_n$. The operator will have been instructed to respond to this question by entering a number into the remote terminal, using the NUMBER keys in the keyboard 24A, which represents the desired isodepth or isotherm. In step 510, CPU 60 then waits for the NEW DATA bit in the UART status register to be set.

With reference again to FIG. 13, the entry of any such number by the operator causes the production of a control signal on the UART data interrupt line, so that the UART data is transferred to the data buffer in step 350. Since the UART data is a number, the determination in step 352 is negative, as a result of which CPU 60 proceeds, in step 356, to make a test to determine if the UART data is a number. In the situation being discussed, the determination in step 356 is positive so that CPU 60, in step 358, stores the number in the number buffer, and then returns to the main program loop, However, CPU 60 cannot exit from step 510 (FIG. 16(a)), since the NEW DATA bit has not yet been set. The operator will have been instructed to actuate the ENTER key in the keyboard 24A, resulting in the production of the command comprising the ENTER data word, if the number that has been previously entered is correct. With reference again to FIG. 13, the resultant production of a control signal on the UART data interrupt line results in CPU 60 passing through step 350 as previously described, and in making negative determinations in steps 352 and 356. In step 358, CPU 60 recognizes the UART data as a directive, and in step 360 makes a test to determine if the directive is the ENTER data word. In the situation being discussed, the determination in step 360 is positive, as a result of which CPU 60 proceeds, in step 362, to change the number stored in the number buffer to binary form, and to store the resultant binary number in the binary number buffer. CPU 60 thereafter, in step 364, sets the NEW DATA bit and the NUMBER bit in the UART status register, and returns to the main program loop.

Referring again to FIG. 16(a), the setting of the NEW DATA bit causes the CPU 60 to exit from step 510 and to proceed to step 512, wherein a test is made to determine if the COMMAND bit in the UART status register is set. In the situation being discussed, the determination in step 512 is negative so that CPU 60 proceeds to step 514, wherein a test is made to determine if the NUMBER bit in the UART status register is set. In the situation being discussed, the determination in step 514 is positive, whereupon the CPU 60, in step 518, stores the binary number in the binary number buffer in the track number register, and specifically as the DEPTH/TEMP byte therein.

The operator, however, may have made a mistake in entering the desired isodepth or isotherm, or may wish to select another type of geographic position locator for vessel course control, or may have made another mistake in actuation of the keys in the keyboard 24A. To change the number previously entered, the operator depresses the CLEAR key, resulting in the production of the command comprising the CLEAR data word. The NEW DATA bit and COMMAND bit in the UART status register are accordingly set, and CPU 60, in step 512, makes a positive determination and thereafter proceeds, in step 522, to make a test to determine if the command comprises the CLEAR data word. In the situation being discussed, the determination in step 522 is positive, as a result of which CPU 60 proceeds in step 526, to determine if the NEW DATA bit and the COMMAND bit are again set within a period of ten seconds. In the situation being discussed, the determination in step 526 is negative, as a result of which CPU 60 returns to step 508, whereupon either the ISODEPTH? or ISOTHERM? data words are displayed.

To select another type of geographic position locator, the operator will actuate the CLEAR and DEPTH or TEMP keys in succession. If either the DEPTH or the TEMP key is actuated within ten seconds after the CLEAR key, the determination in step 526 is positive, as a result of which CPU 60, in step 526, makes a test to determine if the command comprises either the DEPTH or the TEMP data words (depending upon the GPL FUNCTION byte in the system status 2 register). If the determination in step 528 is positive, CPU 60 exits from the depth/temp subroutine 314 and returns to step 302 in the main program loop (FIG. 12), whereupon the FUNCTION data word is displayed.

If, in attempting to select another type of geographic position locator, the operator inverts the order in which the CLEAR and DEPTH or TEMP keys are actuated, the determination in step 522 is negative, so that CPU 60, in step 524, waits for a period of ten seconds (in which display of the command continues) and then returns to step 508, whereupon either the ISODEPTH? or ISOTHERM? data words are displayed. Likewise, if the operator successively actuates the CLEAR key and a key which does not correspond to the geographic position locator function (represented by the GPL FUNCTION byte in the system status 2 register), the determination in step 528 is negative so that CPU 60 immediately returns to step 508. Similarly, if the operator should inadvertently actuate one of the directive keys other than the ENTER key following entry of a number, the NUMBER bit is not set (reference FIG. 13) and the determination in step 514 is negative, as a result of which CPU 60, in step 516, waits for a period of ten seconds, and then returns to step 508.

Let it be assumed that the number is correct, that the ENTER key has been actuated, and that the corresponding binary number has been stored in the track number register in step 518. With reference to FIG. 16(b), CPU 60 then proceeds, in step 530 to transmit either the DEEPER? data word or the WARMER? data word (depending upon the GPL FUNCTION byte in the system status 2 register) to the remote terminals $24_1$–$24_n$ for display thereby. At this point, the operator must decide whether actual water depths are deeper to the right or to the left of the isodepth that has been entered, or whether actual water temperatures are warmer to the right or to the left of the isotherm that has been entered. After making this decision, the operator actuates either the RIGHT or the LEFT keys in the keyboard 24A, resulting in the production of a directive comprising either the LEFT data word or the RIGHT data word. With reference again to FIG. 13, a resultant control signal on the UART data interrupt line causes CPU 60 to proceed through step 350, as previously described. Since the UART data is a directive, the determinations in steps 352 and 356 are negative, whereupon CPU 60 proceeds through step 368 to the test in step 360. Since the directive does not comprise the ENTER data word, the determination in step 360 is also negative, as a result of which CPU 60, in step 366, sets the NEW DATA bit and the DIRECTIVE bit in the UART status register, and then returns to the main program loop.

In step 532 (FIG. 16(b)), CPU 60 detects the NEW DATA bit, and proceeds, in step 534, to make a test to determine if the DIRECTIVE bit has been set. In the situation being discussed, the determination in step 534 is positive so that CPU 60 proceeds, in step 536, to determine if the directive comprises either the RIGHT or the LEFT data words. In the situation being discussed, the determination in step 536 is positive so that CPU 60 proceeds, in step 538, to set the LEFT/RIGHT bit in the system status 1 register to either LEFT or RIGHT. If the determination in step 536 is negative (e.g., the operator has actuated either the YES key or the NO key) CPU 60 proceeds in step 540 to wait for a period of ten seconds, and then returns to step 530, whereupon either the DEEPER? or WARMER? data words are displayed. The operator may also inadvertently have actuated one of the NUMBER keys in response to the question posed in step 530. Accordingly, the determination in step 534 is negative, whereupon CPU 60 proceeds, in step 542, to determine if the COMMAND bit has been set. If the UART data comprises a number, the determination in step 542 is negative, whereupon CPU 60 proceeds through step 540 back to step 530. Also, the operator may wish, in response to the question posed in step 530, to clear the display or to select another type of geographic position locator, and actuates one or more of the command keys in the keyboard 24A. In this situation, the determination in step 542 is positive, so that CPU 60 then proceeds in steps 544, 546, 548 and 550 to proceed identically as previously described with respect to steps 522, 524, 526 and 528, as a result of which CPU 60 returns either to step 530 or exits from the depth/temp subroutine 314 and returns to step 302 in the main program loop.

Let it be assumed that the operator, in response to the question posed in step 530, has actuated either the RIGHT or the LEFT key. Therefore, CPU 60 exits from step 538 and proceeds, in step 552, to transmit the READY data word to the remote terminals $24_1$-$24_n$ for display thereby. As in the Loran subroutine 308, display of the READY data word signifies to the operator that the digital computer 22 has acquired all information required for vessel course control. With reference to FIGS. 16(b) and 16(c), CPU 60 then proceeds, in steps 554, 556, 558, 560, 562, 564, 568, 570, 572 and 574, to respond to subsequent control of the position of the RUN/STOP switch 202 in the keyboard 24A to place the digital computer 22 in either a "run" mode of operation or a "stop" mode of operation, in a manner identical to that previously described for steps 414–420 and 430–440 in the Loran subroutine 308 (FIG. 14(a) and 14(b)). It will be specifically noted that CPU 60, in step 562, enables the input data interrupt line in the control bus 76. As a result, each control signal on the input data interrupt line (representing a data word from the selected geographic position locator) causes CPU 60 to undertake the input data interrupt subroutine illustrated in FIG. 15. The operation of the input data interrupt subroutine proceeds identically as previously described, with CPU 60 additionally referring the DEPTH/TEMP byte in the track number register, along with position information in the input data from the geographic position locator, to the floating point processor 62 for the calculation of cross-track error in step 476 (FIG. 15).

When the READY data word is being displayed, the operator has the ability to either clear the display or to select another type of geographic position locator, by supplying appropriate commands to the digital computer 22 which are acted upon by CPU 60 in steps 576, 578, 580 and 582 in a manner similar to that of steps 522–528 and 544–550. As a result of these commands, CPU 60 either returns to step 552, or exits from the depth/temp subroutine 314 and returns to step 302 in the main program loop.

Referring back to the Loran subroutine 308 (FIG. 14), it will be remembered that if the determination in step 408 is negative, that is, if the selected geographic position locator does not have the capability of providing cross-track error information, CPU 60 goes to the Loran cross-track error subroutine 410 illustrated in FIGS. 17(a)-17(d). This subroutine allows the operator to select either a single Loran line of position as the desired geographic track, or, to permit the digital computer 22 to calculate a desired geographic track between the actual geographic position of the vessel and a desired geographic position thereof, by the entry of first and second Loran lines of position whose intersection represents the actual geographic position of the vessel, and third and fourth Loran lines of position whose intersection represents the desired geographic position of the vessel.

Therefore, CPU 60, in step 600, transmits the LOP1? data word to the remote terminals $24_1$-$24_n$ for display thereby. In response to the question posed by the display of the LOP1? data word, the operator will have been instructed to enter a number corresponding either to the Loran line of position representing the desired geographic track, or the first Loran line of position used to determine the actual position of the vessel. Number entry then proceeds identically as described for the depth/temp subroutine 314 (e.g., steps 510–516), as a result of which CPU 60, in step 602, stores a binary number corresponding to the entered number as the LOP1 byte in the track number register. CPU 60 then proceeds to step 604, in which the LOP2? data word is transmitted to the remote terminals $24_1$-$24_n$ for display thereby. In response to the question posed by display of the LOP2? data word, the operator will have been instructed to either signify to the digital computer 22 that the previously-entered line of position is the desired geographic track, in which case the operator will actuate the NO key in the keyboard 24A resulting in production of a directive comprising the NO data word, or to enter the second Loran line of position needed for determination of the actual geographic position of the vessel, in which case the operator will enter a corresponding number through the use of the NUMBER keys in the keyboard 24A. In the former case, a resultant setting of the DIRECTIVE bit in the UART status register is determined by CPU 60 in step 606. CPU 60 thereafter, in step 608, makes a test to determine if the directive comprises the NO data word. If the determination in step 608 is positive, CPU 60, in step 610, sets the YES/NO bit in the system status 1 register to NO. In the latter case, the setting of the NUMBER bit in the UART status register is determined by CPU 60 in step 612 so that CPU 60 thereafter, in step 614, proceeds to store the corresponding binary number as the LOP2 byte in the track number register.

After exiting from step 614, CPU 60, in step 616, transmits the LOP3? data word to the remote terminals $24_1$-$24_n$ for display thereby. In response to the question posed by the display of the LOP3? data word, the operator will have been instructed to enter a number corresponding to the third Loran line of position needed for determination of the desired geographic position of the vessel. After proper number entry has been made, CPU 60, in step 618, stores a corresponding binary number as the LOP3 byte in the track number register. Thereafter, CPU 60, in step 620, makes a test to determine if the LOP4 byte in the track number register has been filled. In the situation being discussed, the determination in step 620 is negative so that CPU 60 returns to step 616, whereupon the LOP4? data word is transmitted to the remote terminals $24_1$-$24_n$ for display thereby. In response to the queston posed by the display of the LOP4? data word, the operator will have been instructed to enter a number corresponding to the fourth Loran line of position needed for determination of the desired geographic position of the vessel. After proper number entry, the corresponding binary number is stored by CPU 60 in step 618 as the LOP4 byte in the track number register. As a result, the determination made by CPU 60 in step 620 is positive so that CPU 60 exits from step 620.

From either step 610 or step 620, CPU 60 proceeds to step 622, in which the COURSE? data word is transmitted to the remote terminals $24_1$-$24_n$ for display thereby. In response to the question posed by the display of the COURSE? data word, the operator will have been instructed to indicate to the digital computer 22 whether Loran lines of position are increasing in number to the left or to the right of the desired geographic track represented by the previously-entered lines of position. Using the keyboard 22A, the operator therefore actuates either the LEFT key or the RIGHT key, resulting in the production of a corresponding directive comprising either the LEFT data word or the RIGHT data word. Upon proper directive entry, resultant setting of the DIRECTIVE bit in the UART starts register is determined by CPU 60 in step 624. The identify of the directive as either the LEFT data word or the RIGHT data word is then determined by CPU 60 in step 626, and the LEFT/RIGHt bit in the system status 1 register is accordingly set by CPU 60 in step 628.

CPU 60 then proceeds to step 630, whereupon the READY data word is transmitted to the remote terminals 24₁-24ₙ for display thereby. The sequence of steps thereafter followed by CPU 60 are identical to those previously described for the Loran subroutine 308 (e.g., steps 414-420 and 430-440), whereby the operator can place the digital computer 22 in either a "run" mode of operation or in a "stop" mode of operation by appropriate positioning of the RUN/STOP switch 202. It should specifically be noted that when the input data interrupt line is enabled in step 632, each control signal on the input data interrupt line causes CPU 60 to undertake the input data interrupt subroutine in FIG. 15. The operation of the output data interrupt subroutine proceeds identically as previously described, with CPU 60 additionally referring either the LOP1 byte or the LOP1, LOP2, LOP3 and LOP4 bytes in the track number register, along with position information in the input data from the geographic position locator, to the floating point processor for the calculation of cross-track error in step 476 (FIG. 15).

Figure 16A:
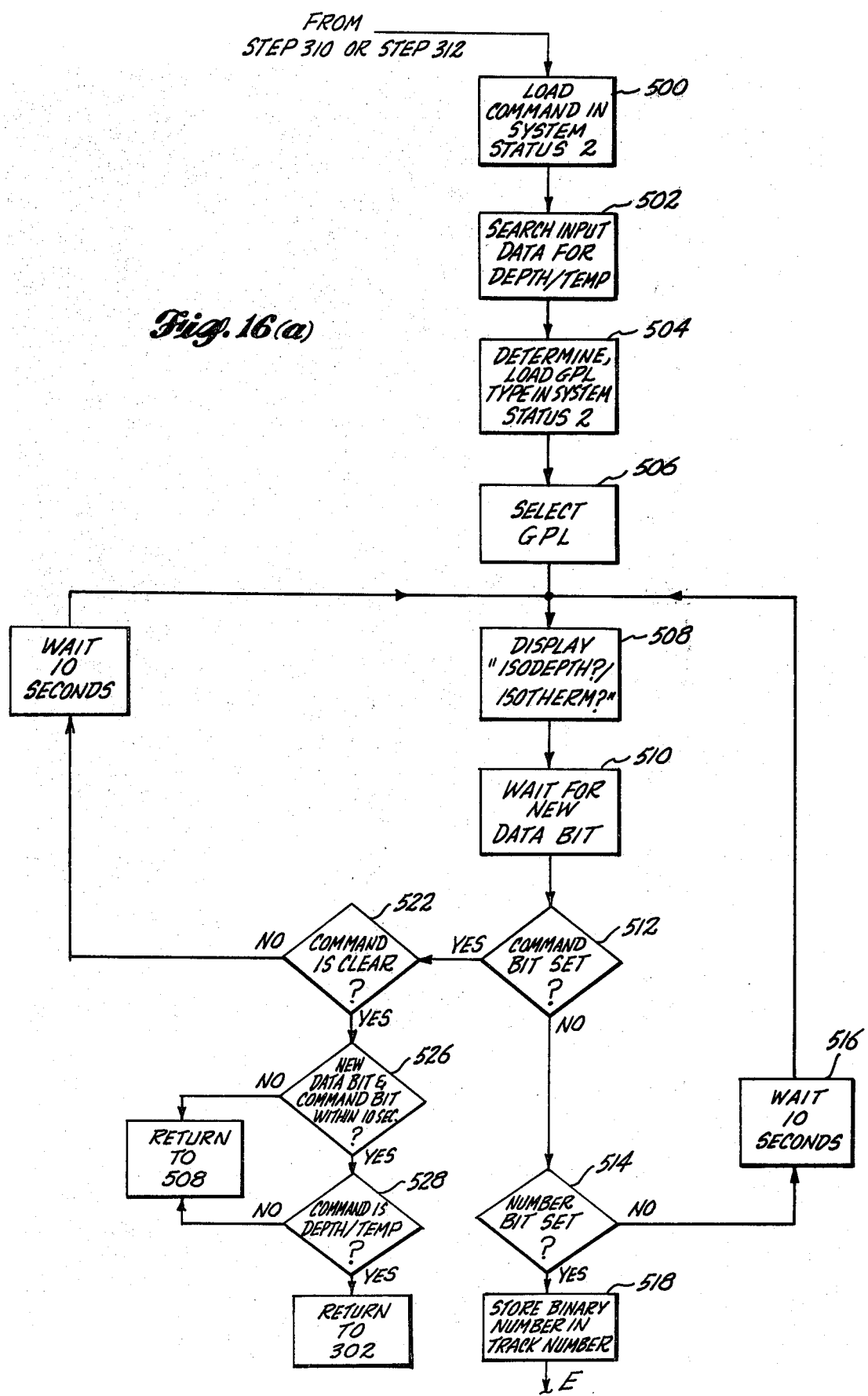
FIG. 16, consisting of FIGS. 16(a), 16(b) and 16(c), is a flow chart of the program steps undertaken by the digital computer in a "depth/temp subroutine"; and, FIG. 17, consisting of FIGS. 17(a), 17(b), 17(c) and 17(d), is a flow chart of the program steps undertaken by the digital computer in a "Loran cross-track error" subroutine.
Figure 16E:
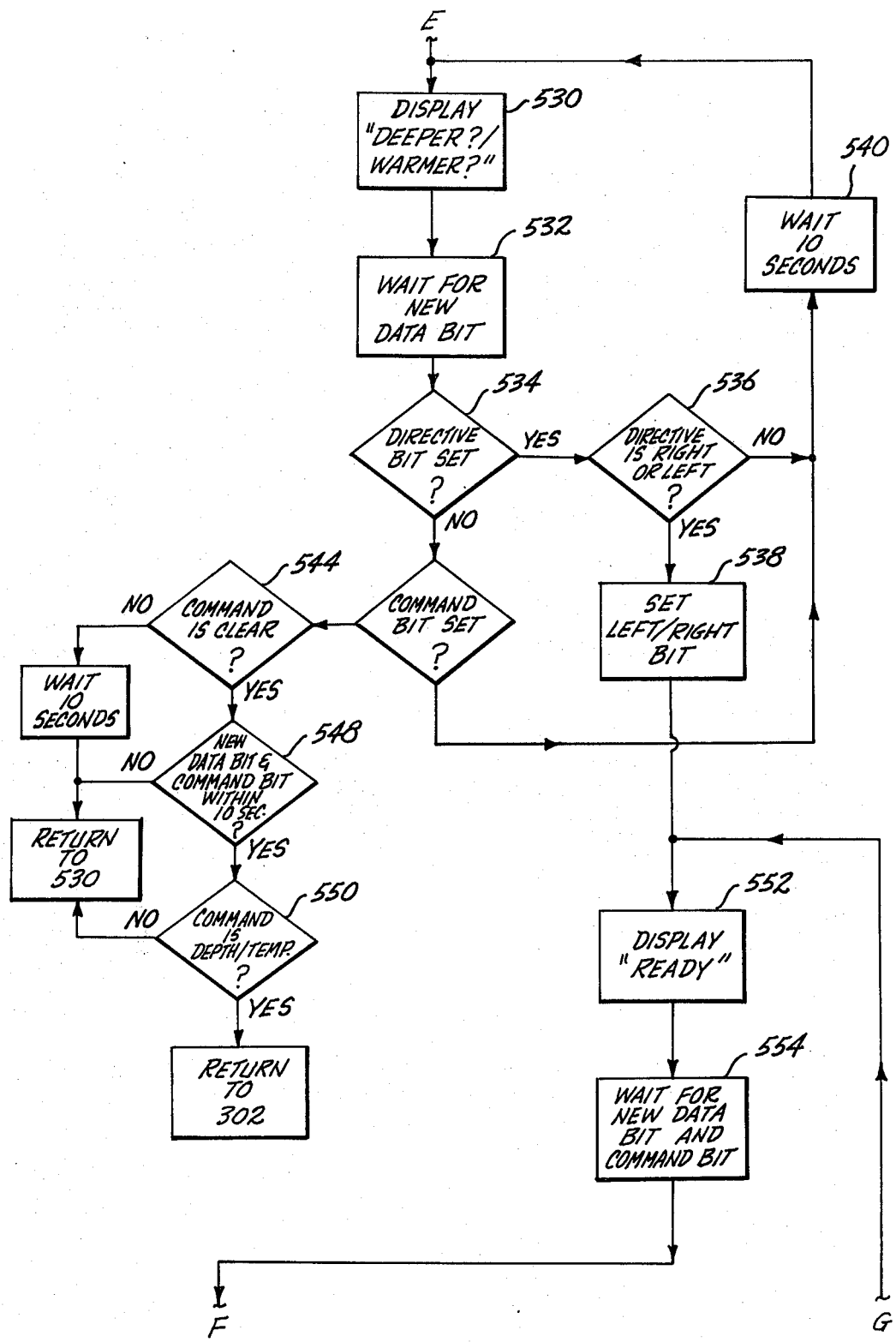
Figure 16C:
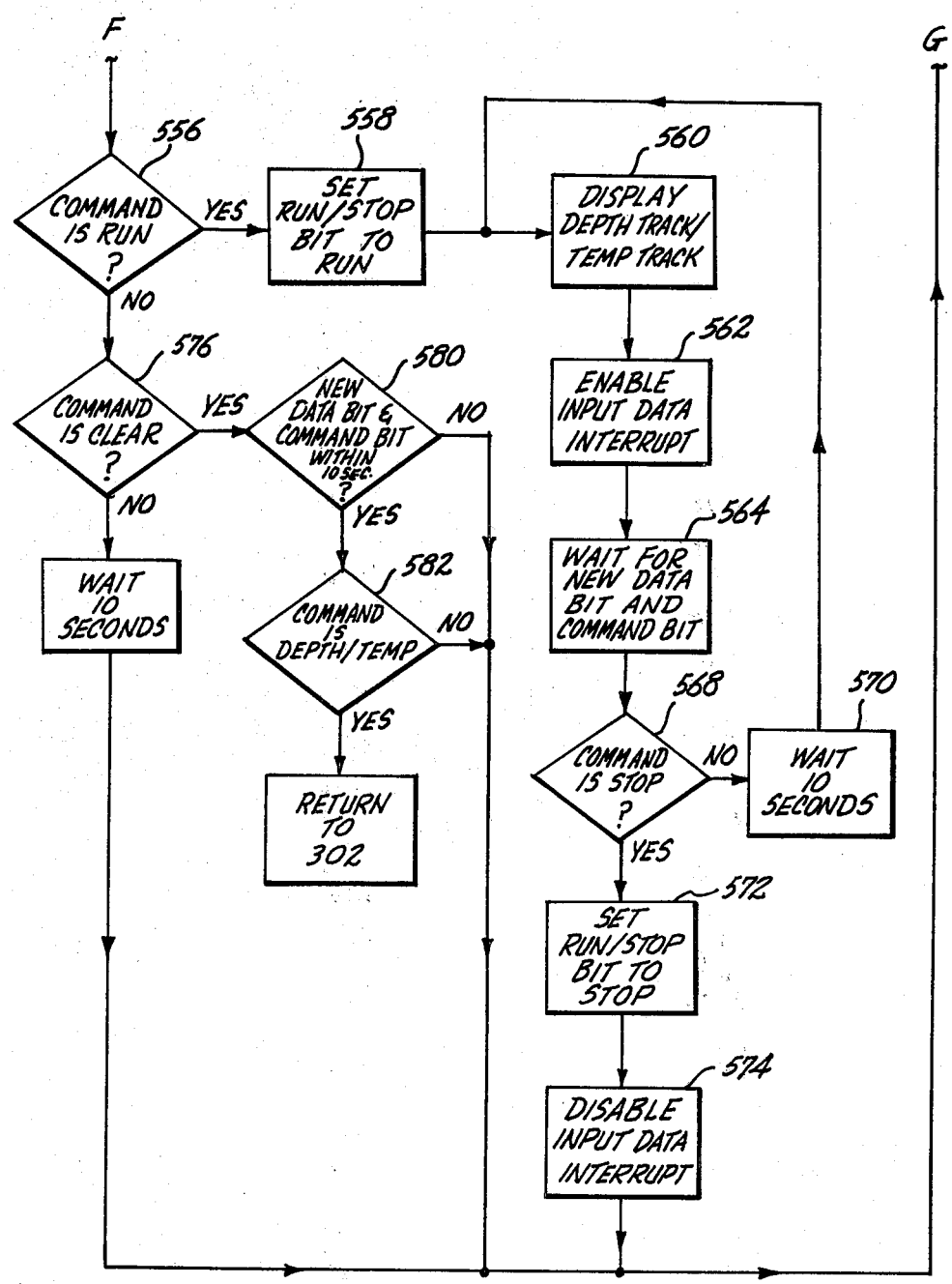
Figure 17A:
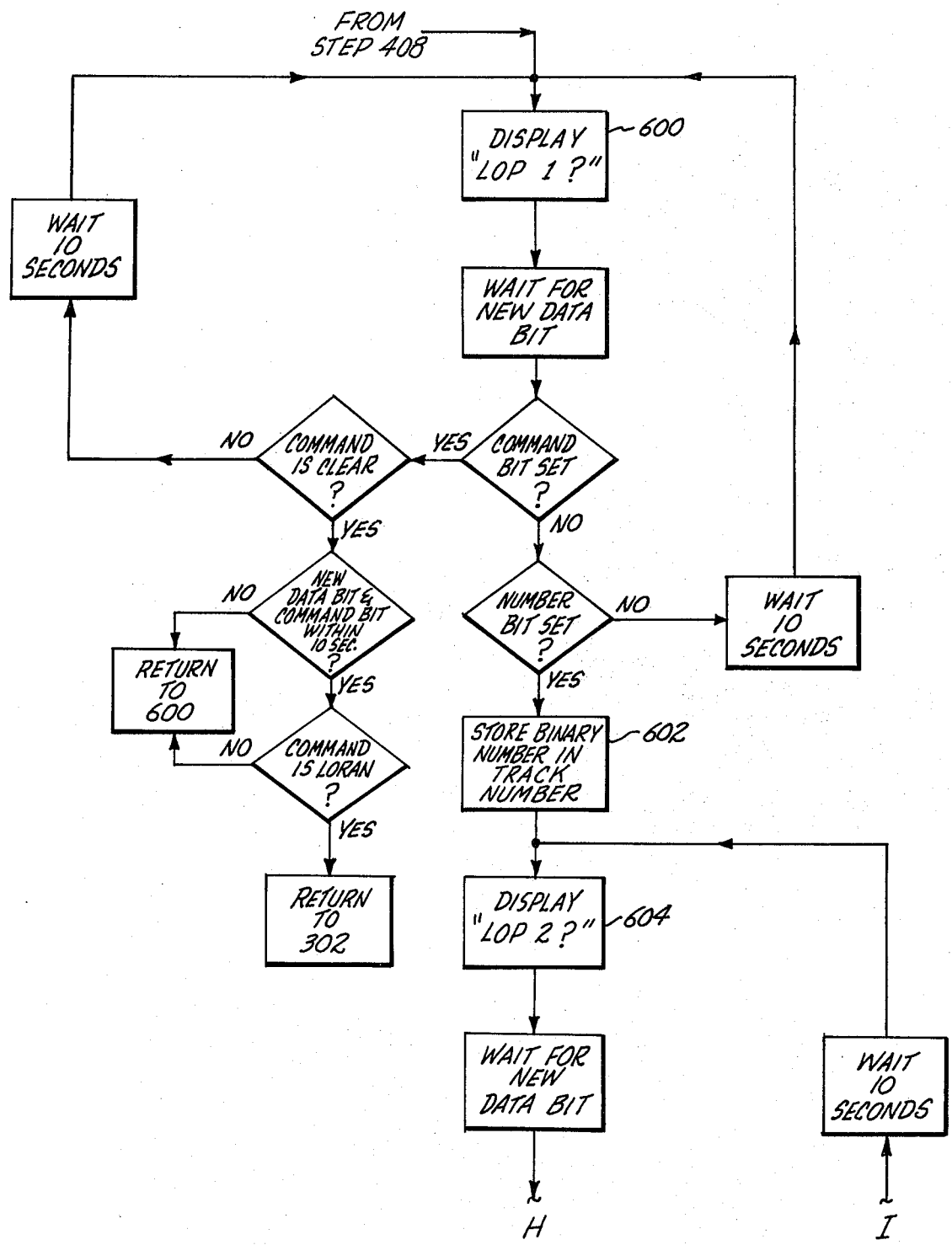
Figure 17E:
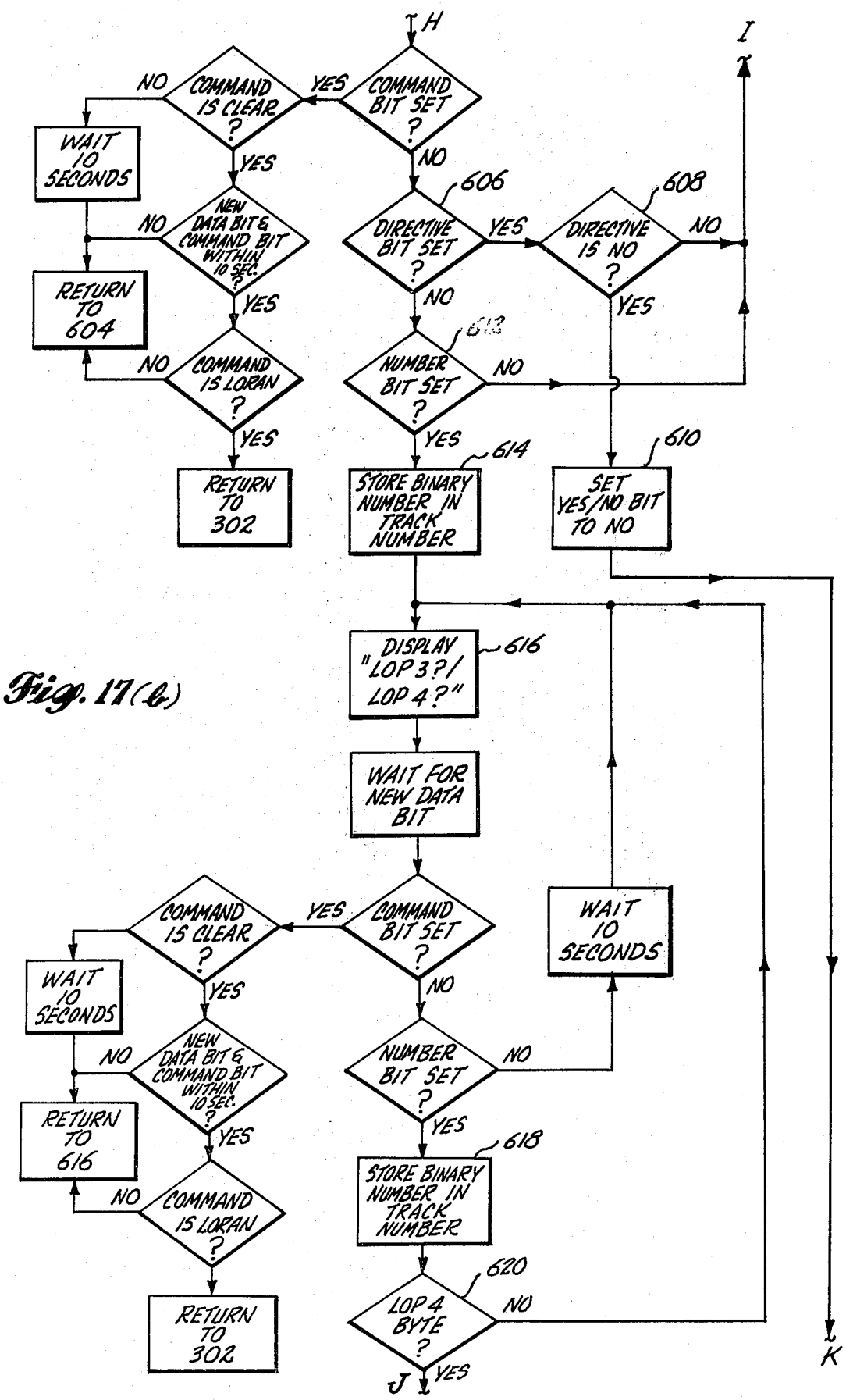
Figure 17C:
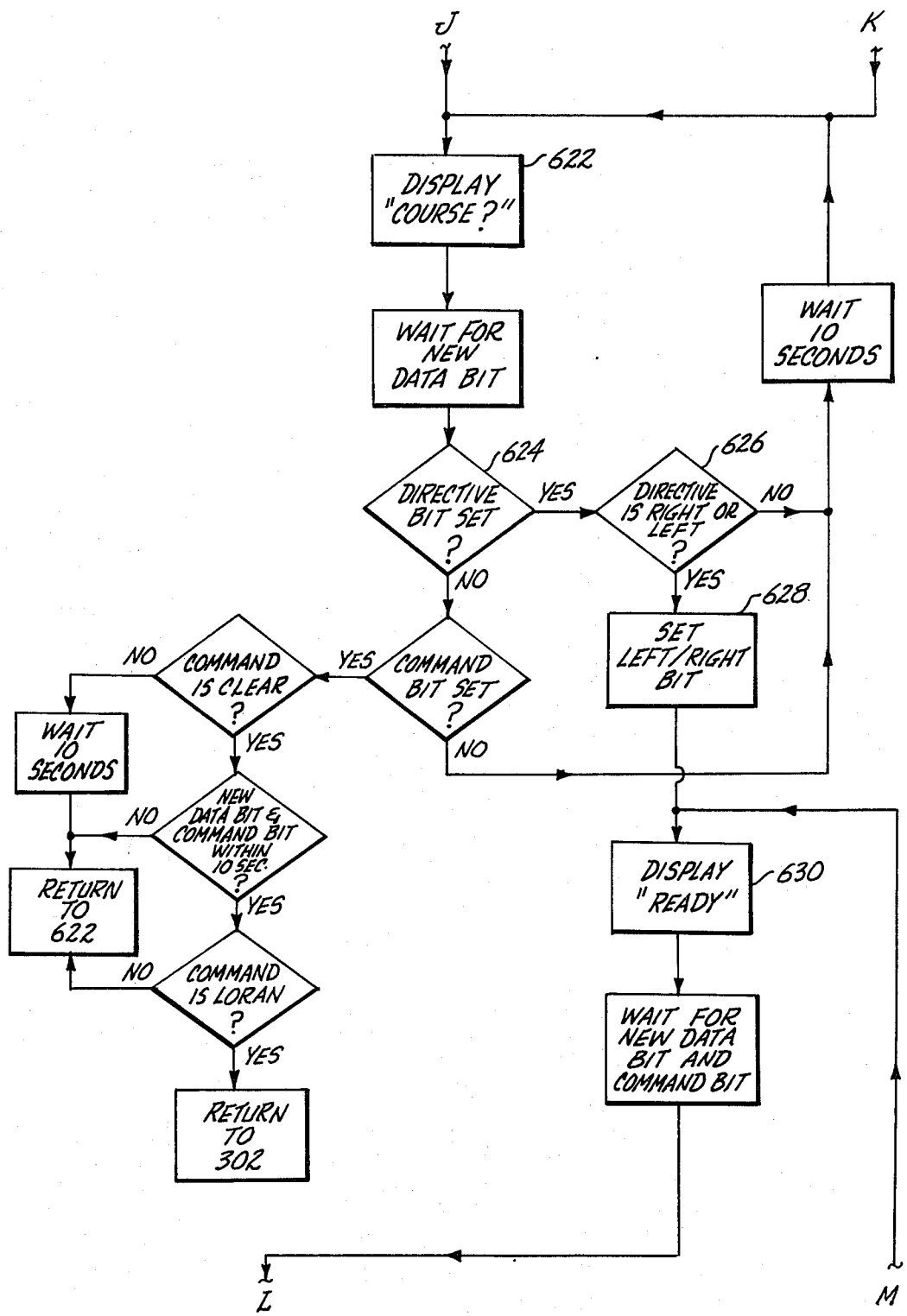
Figure 17D:
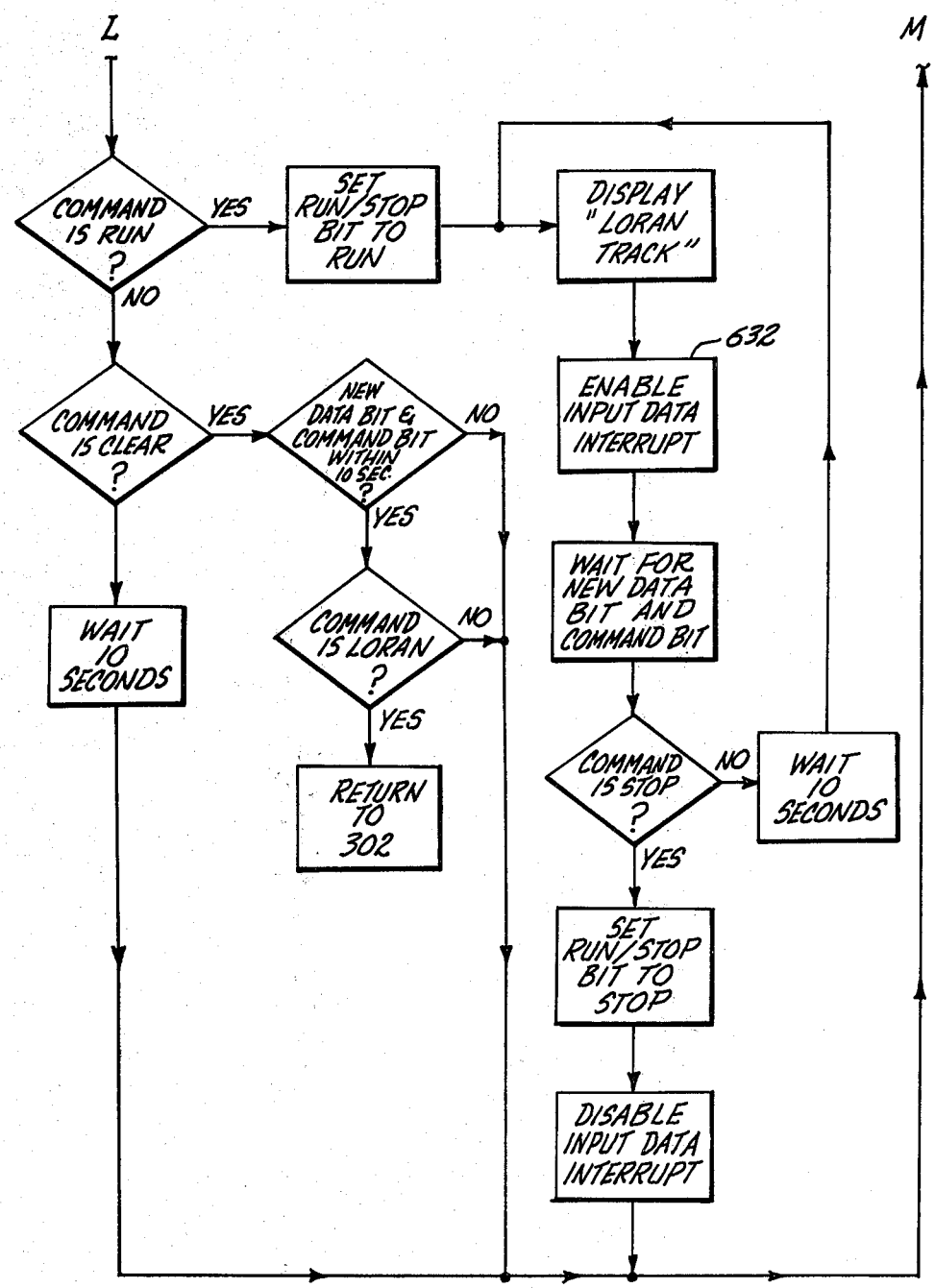

Although not specifically described heretofore, the Loran cross-track error routine in FIGS. 17(a)-17(d) includes a sequence of program steps following the data word displays in each of steps 600, 604, 616, 622 and 630, which permit the operator to clear the display, to select another type of geographic position locator, and which also prevent the entry of improper information into the digital computer 22, with each sequence of program steps functioning in a manner identical to that previously described for the depth/temp subroutine 314 (for example, compare the sequence of program steps between steps 600 and 602 in FIG. 17(a) with steps 510-516 and 522-528 in the depth/temp subroutine illustrated in FIG. 16(a).

While the invention has been described with reference to preferred embodiments, it is to be clearly understood by those skilled in the art that the invention is not limited thereto. Rather, the scope of the invention is to be interpreted only in conjunction with the appended claims.

The embodiments of the invention in which an exclusive property or privilege is claimed are defined as follows:

1. An apparatus for providing a course correction signal which is suitable for combination with a heading error signal in an electronic automatic pilot, whereby the electronic automatic pilot is capable of maintaining the course of a vessel on a predetermined geographic track, said course correction signal being developed from information signals received from a geographic position locator, wherein said apparatus comprises:
first means responsive to said information signals for producing a first output signal that is proportional to cross-track error of the vessel comprising the direction and magnitude of any lateral separation between the actual geographic position of the vessel and said predetermined geographic track;
second means responsive to said first output signal for producing a second output signal that is proportional to the time integral of said cross-track error; and
third means for combining said first and said second output signals to produce said course correction signal.

2. An apparatus as recited in claim 1, wherein said first means includes: means for receiving vessel desired course information; means responsive to said vessel desired course information for determining said predetermined geographic track; and, means for comparing said predetermined geographic track with vessel geographic position information in said information signals for determining said cross-track error.

3. An apparatus as recited in claim 2, further comprising manually operable means for providing said vessel desired course information to said first means.

4. An apparatus as recited in claim 1, wherein said first means includes means responsive to cross-track error information in said information signals for determining said cross-track error.

5. An apparatus as recited in claim 1, further comprising manually operable means for enabling or disabling the production of said course correction signal.

6. An apparatus as recited in claims 1, 2, 3, 4 or 5, further comprising means for providing a visual display of information pertinent to the operation of said apparatus.

7. An apparatus as recited in claim 1, further comprising means responsive to status information in said information signals for detecting an alarm condition and for responsively disabling the production of said course correction signal by disabling said second means and said third means.

8. An apparatus as recited in claim 1, further comprising means responsive to instability in said cross-track error over a predetermined period of time for detecting an alarm condition and for responsively disabling the production of said course correction signal by disabling said second means and said third means.

9. An apparatus as recited in claims 7 or 8, further comprising means responsive to detection of said alarm condition for providing an audible alarm.

10. An apparatus for coupling a geographic position locator to an electronic automatic pilot, said apparatus comprising:
first means adapted to be interconnected with a geographic position locator for receiving information signals therefrom, said first means including: means for detecting cross-track error information in said information signals; and, means for providing a digital output signal containing said cross-track error information; and
second means adapted to interconnect said first means with an electronic automatic pilot, said second means including: means for converting said cross-track error information in said digital output signal into a corresponding first analog signal; means for integrating said first analog signal to provide a second analog signal; and, means for summing said first and said second analog signals to provide a course correction signal which is suitable for combination with a heading error signal in the electronic automatic pilot.

11. An apparatus as recited in claim 10, wherein said first means further includes: means for detecting status information in said information signals; and, means for providing an alarm signal in response thereto; and, wherein said second means includes means responsive to said alarm signal for terminating the production of said course correction signal.

12. An apparatus as recited in claim 10, wherein said first means includes: means for detecting geographic position information in said information signals; and, means responsive to said detected geographic position information for coupling said cross-track error information therefrom.

13. An apparatus as recited in claims 10, 11 or 12, wherein said first means comprises a digital computer.

14. An apparatus for coupling one of a plurality of geographic position locators to an electronic automatic pilot, wherein each geographic position locator is capable of providing either cross-track error information or geographic position information relating to the actual course of a vessel, said apparatus comprising:
   a digital computer which is adapted to receive information signals from each of said plurality of geographic position locators, said digital computer including: means for transmitting digital computer data to and for receiving remote terminal data from a remote terminal; means responsive to function command data in said remote terminal data for selecting and decoding those information signals from one of said plurality of geographic position locators; means for detecting cross-track error information in said selected and decoded information signals; and, means for providing a digital output signal containing said cross-track error information;
   at least one remote terminal interconnected with said digital computer; said remote terminal including: means for transmitting remote terminal data to and for receiving digital computer data from said digital computer, manually actuable data entry means which is capable of providing said remote terminal data including said function command data; and, visual display means for displaying said remote terminal data and said digital computer data.

15. An apparatus as recited in claim 14, wherein said manually actuable data entry means is capable of providing mode command data in said remote terminal data; and, wherein said digital computer further includes means responsive to said mode command data for enabling or disabling said digital output signal.

16. An apparatus as recited in claim 14, wherein said digital computer further includes: means responsive to status information in said selected and decoded information signals for detecting an alarm condition; and, means responsive to detection of said alarm condition for disabling said digital output signal.

17. An apparatus as recited in claim 16, wherein said digital computer further includes means responsive to instability in said cross-track error information over a predetermined period of time for detecting an alarm condition.

18. An apparatus as recited in claims 16 or 17 wherein said digital computer further includes means for producing alarm data in said digital computer data upon detection of said alarm condition; and, where said remote terminal includes means responsive to said alarm data for providing an audible alarm.

19. An apparatus as recited in claim 14,
   wherein said digital computer further includes: means for detecting geographic position information in said selected and decoded information signals; and, means responsive to detection of said geographic position information for providing question data in said digital computer data for display by said visual display means in said remote terminal;
   wherein said manually actuable data entry means in said remote terminal is further capable of providing vessel desired course data in said remote terminal data;
   wherein said digital computer further includes means responsive to said vessel desired course data for determining a predetermined geographic track; and, means for determining cross-track error information from said geographic position information and from said predetermined geographic track.

20. An interface unit for converting a digital signal containing cross-track error information in the form of one or more serial data words representing the sign and magnitude of cross-track error into an analog course correction signal, and for coupling said analog course correction signal into an electronic automatic pilot, said interface unit comprising:
   (a) a digital-to-analog converter adapted to be supplied with said digital signal for converting each said serial data word into a corresponding analog signal whose polarity and amplitude are proportional to the sign and magnitude of said cross-track error;
   (b) an amplifier for producing an amplified analog signal from said analog signal;
   (c) an integrator for producing a time integral signal from said amplified analog signal, said time integral signal being proportional to the time integral of said cross-track error;
   (d) first means for summing said amplified analog signal and said time integral signal to produce an analog course correction signal; and
   (e) second means adapted to sum said analog course correction signal with an analog heading error signal in an electronic automatic pilot to produce a corrected analog heading error signal.

21. An interface unit as recited in claim 20, wherein said digital signal also includes enable information in each said serial data word, said enable information having first and second values, and wherein said interface unit further comprises:
   (a) first switch means connected in shunt with said integrator;
   (b) second switch means for coupling said course correction signal from said first summing means to said second summing means;
   (c) means for detecting said enable information; and
   (d) means responsive to said detected enable information for controlling said first and said second switch means, said first switch means being opened and said second switch means being closed when said enable information has said first value, and said first switch means being closed and said second switch means being opened when said enable information has said second value.

22. A marine control system for maintaining the course of a vessel on a predetermined geographic track in accordance with information signals received from a geographic position locator, said marine control system comprising:
   first means responsive to said information signals for producing a course correction signal that is related to the vessel's cross-track error comprising the direction and magnitude of any lateral separation between the actual geographic position of the vessel and said predetermined geographic track, said first means including means responsive to said information signals for producing a first output signal that is proportional to the vessel's cross-track error, means responsive to said first output signal for producing a second output signal that is proportional to the time integral of said cross-track error, and means for combining said first and said second output signals to produce said course correction signal;

a heading error sensor for providing a heading error signal that is related to the sign and magnitude of any angular deviation between the actual heading of the vessel and a desired heading thereof generally aligned with said predetermined geographic track;

second means for combining said course correction signal and said heading error signal to produce a corrected heading error signal;

a control surface angle sensor for producing a control surface angle signal that is related to the sign and magnitude of any angular deviation between a control surface of the vessel and the vessel's longitudinal axis;

third means for differentially combining said corrected heading error signal and said control surface angle signal to produce a control surface position signal; and fourth means responsive to said control surface position signal for controlling the position of said control surface.

* * * * *

UNITED STATES PATENT AND TRADEMARK OFFICE
CERTIFICATE OF CORRECTION

PATENT NO. : 4,253,149
DATED : February 24, 1981
INVENTOR(S) : Cunningham et al.

It is certified that error appears in the above-identified patent and that said Letters Patent are hereby corrected as shown below:

Abstract, line 15: delete "therby" and insert --thereby--.
Column 2, line 13: delete "Alos," and insert --Also,--.
Column 6, line 52: delete "FIg." and insert --FIG.--.
Column 10, table 1, column 2: "Microcomputer" should be up one space.
Column 11, line 32: delete "th" and insert --the--;
 line 40: delete "a".
Column 12, line 18: delete "all" and insert --allow--;
 line 46: delete "FIG." and insert --FIGS.--.
Column 13, line 1: delete "AND" and insert --and--;
 line 24: delete "suceeding" and insert --succeeding--.
Column 14, line 37: delete "EXECUSIVE" and insert --EXCLUSIVE--;
 line 49: delete "a", second occurrence and insert --of--.
Column 15, line 29: delete "is" and insert --are--;
 line 34: Delete "words" and insert --word--;
 line 35: delete "signifies" and insert --signify--;
 line 67: delete "from signal".
Column 17, line 58: delete "will be brought".
Column 23, line 39: delete "internal" and insert --interval--.

UNITED STATES PATENT AND TRADEMARK OFFICE
CERTIFICATE OF CORRECTION

PATENT NO. : 4,253,149      Page 2 of 2

DATED : February 24, 1981

INVENTOR(S) : Cunningham et al.

It is certified that error appears in the above-identified patent and that said Letters Patent are hereby corrected as shown below:

Column 27, line 21: delete "is" and insert --in--.
Column 28, line 52: delete "," and insert --.--.
Column 33, line 5: delete RIGHt" and insert --RIGHT--;
           line 41: before the period insert --)--.
Column 35, line 5: delete "coupling" and insert --computing--.

Signed and Sealed this

Eleventh Day of August 1981

[SEAL]

Attest:

GERALD J. MOSSINGHOFF

*Attesting Officer*     *Commissioner of Patents and Trademarks*